(12) United States Patent
Suyama et al.

(10) Patent No.: US 10,478,043 B2
(45) Date of Patent: Nov. 19, 2019

(54) STICKY CLEANER

(71) Applicants: Kabushiki Kaisha Nitoms, Tokyo (JP); Nitto Denko Corporation, Ibaraki-shi, Osaka (JP)

(72) Inventors: Yousuke Suyama, Tokyo (JP); Teiji Sakashita, Tokyo (JP); Yoshihiro Hashizume, Tokyo (JP); Yumi Kawai, Tokyo (JP); Takenobu Kojima, Tokyo (JP); Itsumi Terada, Tokyo (JP)

(73) Assignees: KABUSHIKI KAISHA NITOMS, Shinagawa-ku, Tokyo (JP); NITTO DENKO CORPORATION, Ibaraki-si, Osaka (JP)

( * ) Notice: Subject to any disclaimer, the term of this patent is extended or adjusted under 35 U.S.C. 154(b) by 168 days.

(21) Appl. No.: 15/538,346

(22) PCT Filed: Dec. 22, 2015

(86) PCT No.: PCT/JP2015/085861
§ 371 (c)(1),
(2) Date: Jun. 21, 2017

(87) PCT Pub. No.: WO2016/104520
PCT Pub. Date: Jun. 30, 2016

(65) Prior Publication Data
US 2017/0340189 A1  Nov. 30, 2017

(30) Foreign Application Priority Data
Dec. 24, 2014 (JP) .................. 2014-261357

(51) Int. Cl.
*A47L 25/00* (2006.01)
*C09J 133/00* (2006.01)
(Continued)

(52) U.S. Cl.
CPC ............ *A47L 25/005* (2013.01); *A47L 25/00* (2013.01); *C09J 7/385* (2018.01); *C09J 7/387* (2018.01);
(Continued)

(58) Field of Classification Search
CPC ............................. A47L 25/005; A47L 25/00
(Continued)

(56) References Cited

U.S. PATENT DOCUMENTS

| | | | |
|---|---|---|---|
| 2013/0125322 A1 | 5/2013 | Sakashita et al. | |
| 2015/0320293 A1 | 11/2015 | Sakashita et al. | |
| 2015/0361233 A1 | 12/2015 | Sakashita et al. | |

FOREIGN PATENT DOCUMENTS

| | | |
|---|---|---|
| CN | 103108581 A | 5/2013 |
| EP | 3 015 044 A1 | 5/2016 |

(Continued)

OTHER PUBLICATIONS

Computer generated English translation of JP 2014-64833. (Year: 2014).*

(Continued)

*Primary Examiner* — Laura C Guidotti
(74) *Attorney, Agent, or Firm* — Sughrue Mion, PLLC

(57) ABSTRACT

This invention provides a sticky cleaner used for removing organic dirt deposited on an article surface. The sticky cleaner comprises a dirt-collecting member that collects the organic dirt upon contact with the article surface. The dirt-collecting member has an acrylic PSA in an area that comes in contact with the article surface. The dirt-collecting member exhibits a hardness of 90 or less in the area that comes in contact with the article surface.

17 Claims, 5 Drawing Sheets

(51) Int. Cl.
*C09J 153/00* (2006.01)
*C09J 133/08* (2006.01)
*C09J 7/38* (2018.01)

(52) U.S. Cl.
CPC ........... *C09J 133/00* (2013.01); *C09J 133/08* (2013.01); *C09J 153/00* (2013.01); *C09J 2201/622* (2013.01); *C09J 2433/00* (2013.01); *C09J 2433/006* (2013.01)

(58) Field of Classification Search
USPC .................................................... 15/104.002
See application file for complete search history.

(56) References Cited

FOREIGN PATENT DOCUMENTS

| | | |
|---|---|---|
| JP | 2006-223562 A | 8/2006 |
| JP | 2007-175473 A | 7/2007 |
| JP | 2011-139719 A | 7/2011 |
| JP | 2014-064833 A | 4/2014 |
| TW | 201335296 A | 9/2013 |
| TW | 201436890 A | 10/2014 |
| WO | WO 2011/091214 A1 * 7/2011 ........... A47L 25/005 |
| WO | 2013/015075 A1 1/2013 |
| WO | 2014/115632 A1 7/2014 |
| WO | 2014/115633 A1 7/2014 |

OTHER PUBLICATIONS

Extended European Search Report dated May 4, 2018 from the European Patent Office in counterpart application No. 15873088.7.
Notification of Reasons for Refusal dated Nov. 22, 2018 from the Japanese Patent Office in counterpart Japanese application No. 2014-261357.
International Search Report for PCT/JP2015/085861 dated Mar. 15, 2016 [PCT/ISA/210].
Written Opinion for PCT/JP2015/085861 dated Mar. 15, 2016 [PCT/ISA/237].
The First Office Action dated Feb. 3, 2019 from the State Intellectual Property Office of the P.R.C. in counterpart Application No. 201580070863.9.
Office Action dated May 6, 2019 by the Taiwanese Patent Office in application No. 104143639.
Decision of Refusal dated Aug. 15, 2019 issued by the Japanese Patent Office in counterpart Japanese application No. 2014-261357.

* cited by examiner

STICKY CLEANER

TECHNICAL FIELD

The present invention relates to a sticky cleaner used for removing organic dirt.

This application is a National Stage of International Application No. PCT/JP2015/085861 filed Dec. 22, 2015, claiming priority based on Japanese Patent Application No. 2014-261357 filed on Dec. 24, 2014; and the entire contents of all of which are incorporated herein by reference in their entirety.

BACKGROUND ART

Displays typically formed of liquid crystal panels or an organic EL (OEL) panels are placed on surfaces of portable devices, for instance, portable PCs such as notebook PCs; tablet terminals such as electronic books; mobile phones such as smartphones; mobile gaming devices; various types of PDA (personal digital assistant); and the like. These portable devices are carried and used on a daily basis, and thus easily attract dust and organic dirt such as finger marks, cosmetics and sebum. In particular, recently wide-spread touch-screen portable devices include display/input members and are operated with a direct finger touch by a user to the display/input members with the displays functioning also as input devices, and thus are more likely to attract organic dirt such as finger marks, sebum, etc. Not just these portable devices, but also show window glass, glass tables, showcases and the like accumulate organic dirt, leading to degradation of their exterior to make them unsightly.

To tackle such organic dirt, sticky cleaners are suggested, which remove organic dirt from the surfaces of the articles upon contact therewith (Patent Documents 1 and 2). Patent Document 3 is a technical document related to an adhesive cleaning roller, but is not intended for removal of organic dirt.

CITATION LIST

Patent Literature

[Patent Document 1] WO 2013/015075
[Patent Document 2] WO 2014/115632
[Patent Document 3] Japanese Patent Application Publication No. 2007-175473

SUMMARY OF INVENTION

Technical Problem

The present invention relates to improvement of a sticky cleaner for organic dirt removal. In particular, a purpose thereof is to provide a sticky cleaner having good organic dirt removability.

Solution to Problem

This description provides a sticky cleaner used for removing organic dirt deposited on an article surface. The sticky cleaner comprises a dirt-collecting member that collects the organic dirt upon contact with the article surface. The dirt-collecting member comprises a pressure-sensitive adhesive (PSA) in an area that comes in contact with the article surface. In a preferable embodiment, the PSA is an acrylic PSA. In the dirt-collecting member, the area that comes in contact with the article surface has a hardness of 90 or less. In the sticky cleaner, the hardness of the area that comes in contact with the article surface (or a surface subject to cleaning, a surface being cleaned, etc., hereinafter)—the hardness of the dirt-collecting member—is as low as or lower than 90; and therefore, it is allowed to favorably make contact with the surface subject to cleaning. The hardness combined with the acrylic PSA can bring about a sticky cleaner with good organic dirt removability. As used herein, the hardness refers to the Asker C hardness based on JIS K 7312 unless otherwise indicated. In particular, the hardness is determined by the method described later in the working examples.

In addition, this description provides a sticky cleaner used for removing organic dirt deposited on an article surface, wherein the sticky cleaner comprises a dirt-collecting member that collects the organic dirt upon contact with the article surface, and the dirt-collecting member has a PSA in an area that comes in contact with the article surface; and the PSA has a triolein absorption of 0.05 mg/mm$^3$ or greater. The use of PSA having such great triolein absorption can bring about a sticky cleaner that shows good organic dirt removability (e.g. sebum dirt removability).

In the sticky cleaner, the dirt-collecting member preferably has a hardness of 90 or less. This allows for favorable contact between the PSA and the surface being cleaned. A combination of the dirt-collecting member satisfying the hardness and the PSA with high triolein absorption per volume can bring about a sticky cleaner with greater organic dirt removability.

This description also provides a sticky cleaner used for removing organic dirt deposited on an article surface wherein the sticky cleaner comprises a dirt-collecting member that collects organic dirt upon contact with the article surface, the dirt-collecting member has a PSA in an area that comes in contact with the article surface, and the area has a triolein absorption (or surface absorption, hereinafter) of 2 mg or greater per cm$^2$ area of the PSA. The use of PSA having such great triolein absorption can bring about a sticky cleaner that shows good organic dirt removability (e.g. sebum dirt removability).

In the sticky cleaner, the dirt-collecting member preferably has a hardness of 90 or less. This can lead to a favorable contact between the PSA and the surface being cleaned. With the dirt-collecting member satisfying both the hardness and the surface absorption, the sticky cleaner can be made with greater organic dirt removability.

The organic dirt includes sebum secreted from the skin. As evident from this, the organic dirt may include inorganic compounds such as sodium, potassium and their salts.

In a sticky cleaner disclosed herein, the PSA preferably has a thickness of 200 µm or greater. When the thickness of the PSA is 200 µm or greater, the organic dirt absorption per area of the PSA can be effectively increased. This is significant from the standpoint of downsizing the dirt-collecting member and performance retention (durability) against repeated use.

In a preferable embodiment of the art disclosed herein, the dirt-collecting member comprises a support member on the side of the back face (on the backside) of the PSA. The dirt-collecting member in such an embodiment is preferable because the properties of the support member facilitate adjustment of the dirt-collecting member to suitable hardness. As the material forming the support member, for instance, acrylic resin can be preferably used. Here, the back face of the PSA refers to the face on the reverse side of the front face (the face that comes in contact with an article) of the PSA.

In a preferable embodiment of the sticky cleaner disclosed herein, the dirt-collecting member constitutes a columnar rolling member. The PSA is preferably placed so as to form at least part of the outer circumferential face of the rolling member. According to the cleaner in such an embodiment, when the rolling member is allowed to rotate around the axis of the column, the PSA on the outer circumferential face can efficiently collect organic dirt deposited on an article surface to remove it from the surface.

As the PSA, a PSA comprising an acrylic block copolymer can be preferably used. With the PSA having such a composition, good organic dirt removability can be obtained. For instance, a preferable PSA comprises an acrylic block copolymer as the base polymer. Here, the base polymer of PSA refers to a component that accounts for more than 50% by weight of the polymers in the PSA.

The PSA preferably further comprises a plasticizer. The inclusion of the plasticizer in the PSA can increase the dirt-collecting ability. The inclusion of the plasticizer may facilitate the release from the surface being cleaned to increase the dirt-collecting workability. In addition, even when the dirt-collecting capability degrades as a result of its use, the effect (dirt-removing ability recovery effect) to regain its dirt-collecting capability in relatively short time (e.g. in several minutes or several hours) can be preferably obtained.

A sticky cleaner having the prescribed configuration disclosed herein can effectively remove organic dirt (typically sebum dirt of animal origin, e.g. human sebum dirt). Accordingly, a preferable embodiment of the sticky cleaner disclosed herein is a sticky cleaner used for removing sebum dirt as the organic dirt. The sebum dirt in this description refers to dirt comprising sebum and means to encompass dirt being a mixture of sebum and other organic components as well as inorganic components. Thus, the concept of sebum dirt may include dirt from hands and fingerprints as well as, for instance, a mixture of sebum and inorganic components such as pigment in foundation cream, a mixture of sebum and inorganic components in perspiration such as sodium chloride, a mixture of sebum and organic components such as of moisturizing cream and sunscreen, etc.

In a preferable embodiment of the sticky cleaner disclosed herein, the article is a portable device having a display with a surface (typically a smooth, flat surface) formed of glass or synthetic resin. The portable device is carried and used on a daily basis and is likely to attract organic dirt such as finger marks, cosmetics and sebum. In particular, a portable device having a touch panel display (display/input member) is operated with a direct finger touch to the display/input portion, and thus is more likely to attract organic dirt such as finger marks, cosmetics, sebum, etc. The sticky cleaner disclosed herein can easily remove such organic dirt; and therefore, it is particularly preferably used for removing dirt on a portable device having a display as described above (e.g. a touch panel display).

DESCRIPTION OF EMBODIMENTS

Figure 1:
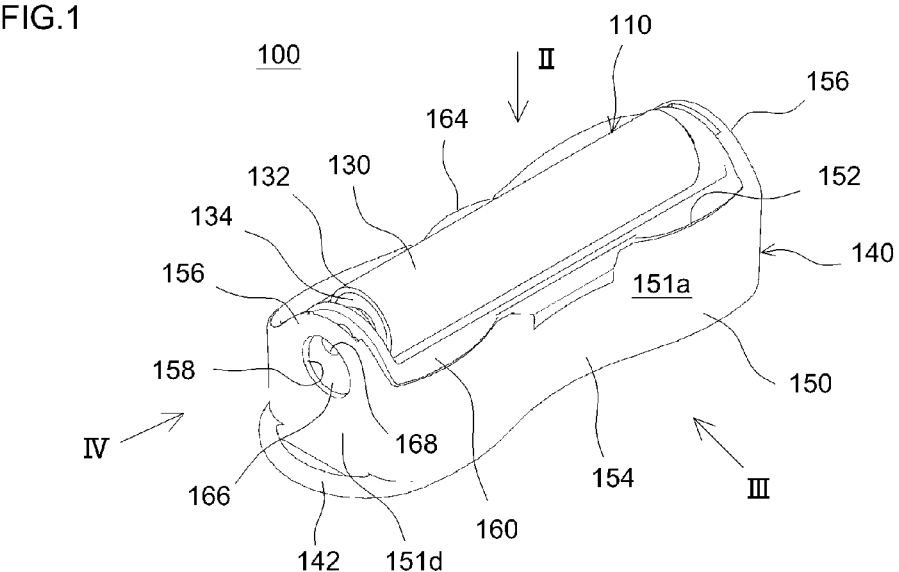
FIG. 1 shows a perspective view of the structure of the sticky cleaner in use according to an embodiment.
Figure 2:
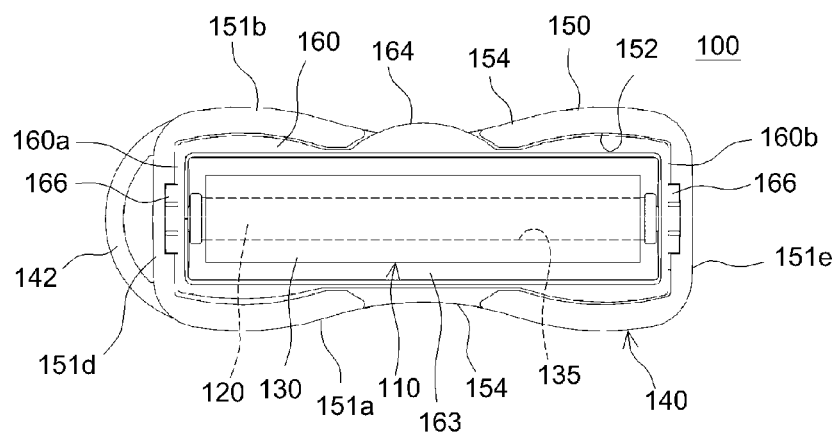
FIG. 2 shows the cleaner in FIG. 1 viewed in the direction of arrow II.
Figure 3:
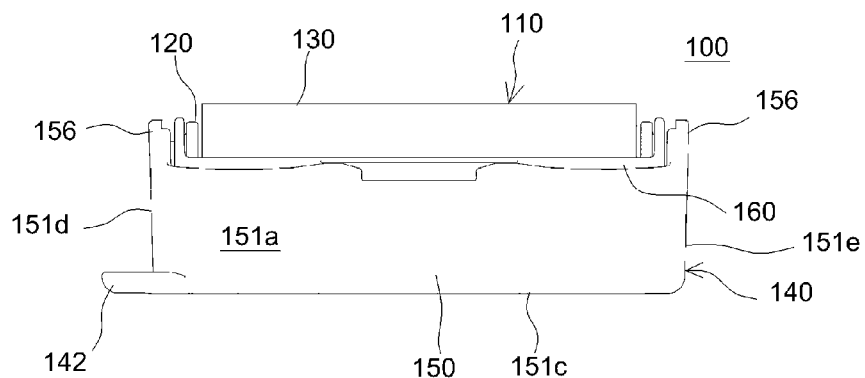
FIG. 3 shows the cleaner in FIG. 1 viewed in the direction of arrow III.
Figure 4:
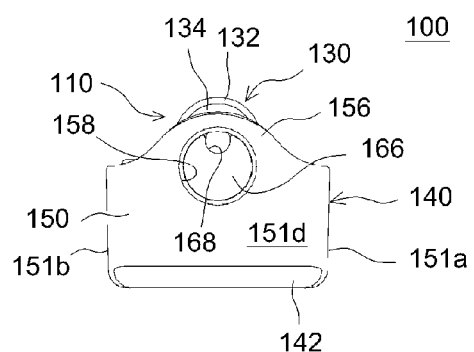
FIG. 4 shows the cleaner in FIG. 1 viewed in the direction of arrow IV.
Figure 5:
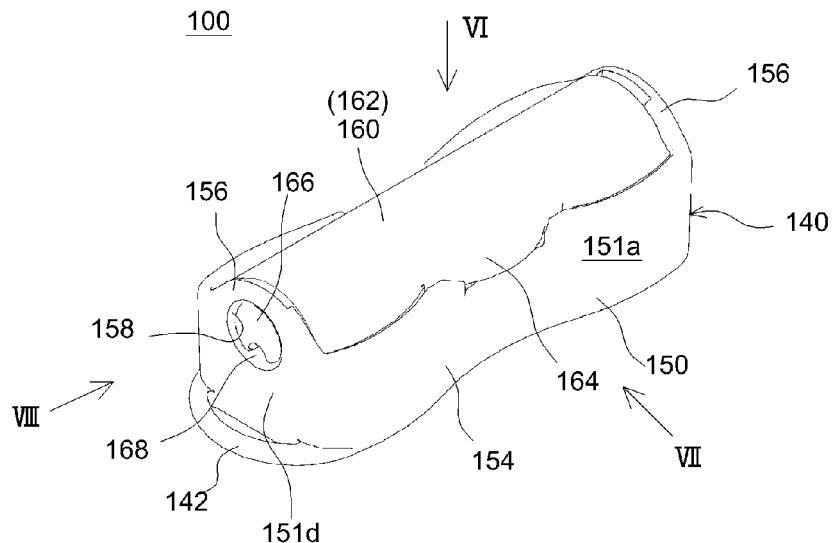
FIG. 5 shows a perspective view of the structure of the sticky cleaner not in use according to an embodiment.
Figure 6:
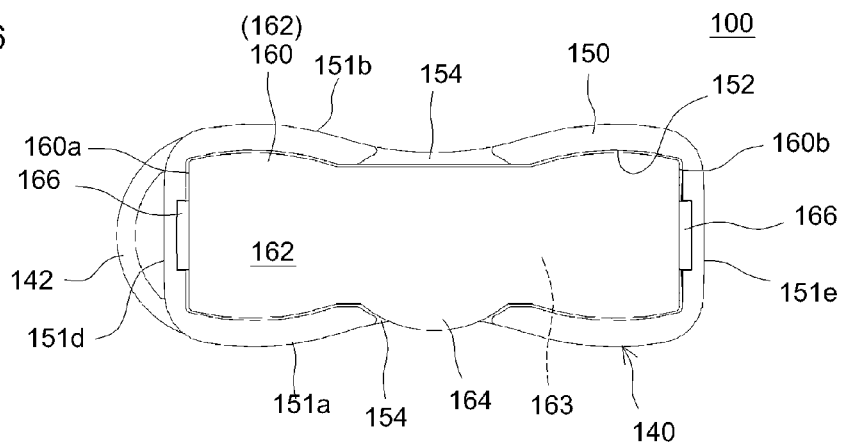
FIG. 6 shows the cleaner in FIG. 5 viewed in the direction of arrow VI.
Figure 7:
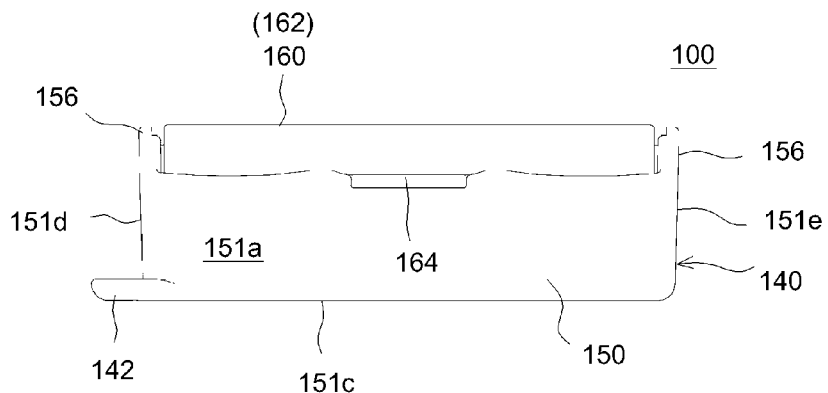
FIG. 7 shows the cleaner in FIG. 5 viewed in the direction of arrow VII.
Figure 8:
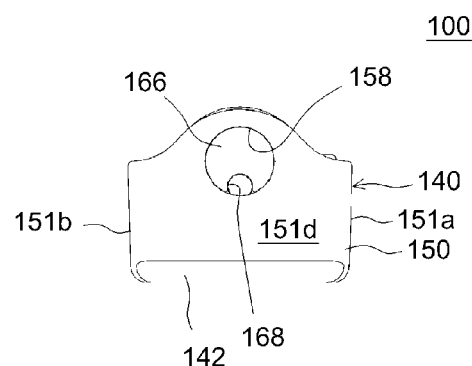
FIG. 8 shows the cleaner in FIG. 5 viewed in the direction of arrow VIII.

Preferred embodiments of the present invention are described below. The present invention is not, however, limited to these embodiments. Matters necessary to practice this invention other than those specifically referred to in this description may be understood as design matters to a person of ordinary skill in the art based on the conventional art in the pertinent field. The present invention can be practiced based on the contents disclosed in this description and technical common knowledge in the subject field. In the drawings referenced below, a common reference numeral may be assigned to members or sites producing the same effects, and duplicated descriptions may be omitted or simplified.

The article on which the sticky cleaner disclosed herein is used is not particularly limited. An article having a smooth surface (typically a smooth, flat surface) is preferable. Examples of such an article include show window glass, glass tables, showcases, mirrors, water tanks (aquariums), various types of display (displays of mounted, free-standing or portable TVs and PCs, etc.), and various types of devices having touch panel display/input members (e.g. free-standing or portable devices such as automated teller machines (ATM), operation terminals of vehicle navigation systems, guide boards, etc.). As organic dirt stuck on their smooth surfaces (e.g. transparent glass surfaces) is unsightly, if found any, its quick removal is desirable. Thus, the sticky cleaner disclosed herein can be preferably used on their surfaces.

Preferable examples of the article on which the sticky cleaner disclosed herein is used include various portable devices. The term portable device herein refers to a mobile device and is not limited to a particular device. A preferable portable device has a smooth surface (typically a smooth, flat surface) at least partially on the outside. Examples of such a portable device include portable devices such as portable PCs such as notebook PCs; tablet terminals such as electronic books, etc.; smartphones and other mobile phones; mobile gaming devices; PDAs (personal digital assistants) such as electronic organizers; digital cameras, digital photo frames, hand-held mirrors and the like. Since these are carried and used on a daily basis, they are likely to attract dust and especially organic dirt such as finger marks, cosmetics and sebum. Some of these portable devices have smooth surfaces (typically glass or synthetic resin surfaces) serving as displays such as liquid crystal displays and OEL displays. Organic dirt on the displays makes information displayed thereon hard to see, thereby hindering the use. Moreover, depending on the amount of organic dirt stuck thereon, it might give a filthy impression. On portable devices having such displays, the sticky cleaner disclosed herein can be preferably used.

Devices having touch panel display/input portions are likely to attract the organic dirt since users directly touch the displays with fingers. Thus, the sticky cleaner disclosed herein can be preferably used on them. Among them, tablet terminals such as electronic books and the like have relatively large displays; and therefore, they are considered as particularly preferable articles on which the sticky cleaner is used.

The sticky cleaner disclosed herein can be preferably used on a smartphone and other mobile phone. When a mobile phone is brought close to one's ear and mouth for a telephone call, etc., it is likely to accumulate organic dirt such as facial sebum and cosmetics on contact with the face. Since the device is used in contact with or in the vicinity of a face, it is greatly significant to remove organic dirt from the surface, thereby to provide users with feelings of cleanliness. Thus, these devices are thought as particularly preferable objects on which the sticky cleaner is used.

<Structure of Sticky Cleaner>

Several embodiments are described next with respect to the sticky cleaner disclosed herein (or simply the cleaner, hereinafter).

First Embodiment

With reference to FIGS. 1 to 9, sticky cleaner 100 according to the first embodiment is described. The cleaner 100 comprises a rolling member 110 that comprises a sticky roll 130, and a casing 140 that axially supports the rolling member 110 in a freely rotatable manner.

Sticky roll 130 is a member that serves as the dirt-collecting member in the present embodiment. Sticky roll 130 is formed overall in a cylindrical shape (in a hollow columnar shape) and has a PSA layer 132 forming the outer circumferential face of the cylinder and a cylindrical support member 134 placed on the inner circumferential side (on the backside) of the PSA layer 132. The PSA layer 132 and the support member 134 are molded into one body, for instance, by co-extrusion. Cleaner 100 is constructed so that the hardness of the dirt-collecting member, i.e. the hardness measured with respect to the outer circumferential face (the surface of the PSA layer 132) of sticky roll 130, is 90 or less. The hardness can be determined by the method described later in the working examples. As used herein, the hardness of the outer circumferential face of a sticky roll (the hardness of a dirt-collecting member) refers to the hardness determined by applying a durometer to the outer circumferential face (PSA surface) of the sticky roll, but is not intended to refer to the hardness of the outermost surface alone with no thickness. The same applies to other embodiments as well. The materials and thicknesses of the PSA layer 132 and the support member 134 can be suitably selected so that the hardness of the dirt-collecting member is in the suitable range. The dimensions of each member of sticky roll 130 can be the same as, for instance, the sticky roll according to Example 1 described later in the working examples.

Casing 140 roughly has a somewhat elongated pillar shape and comprises a main casing 150 having an opening 152 on a side (on a lateral face) of the pillar shape and a lid 160 placed across the opening 152 and attached to the main casing 150 in a rotatable manner.

Casing 150 comprises elongated faces 151a and 151b that bound both sides of the opening 152 in the length direction, a bottom face 151c placed opposite from the opening 152 between the two elongated faces, and end faces 151d and 151e that bound the two ends (limits) of the length direction of the opening 152. The elongated faces 151a, 151b and the bottom face 151c are about 6 cm long in the length direction. The elongated faces 151a and 151b are each about 1.3 cm wide. The elongated faces 151a and 151b are about 2 cm apart at each end of the length direction of the opening 152. At central areas of the length directions of the elongated faces 151a and 151b, constrictions 154 are formed curving inward of the main casing 150. The constrictions 154 may serve to facilitate hand-holding the cleaner 100. Each constriction 154 may be, for instance, about 3 mm to 5 mm deep. The end faces 151d and 151e include extensions 156 that extend to the side of the opening 152 (away from the bottom face 151c) relative to the elongated faces 151a and 151b. In each of these extensions 156, a circular through hole 158 of about 8 mm diameter is formed.

Lid 160 roughly has a half cylinder shape corresponds to the shape obtained by cutting a cylinder, having a top face 160a and a bottom face 160b at two ends of a lateral face 162, in half along a plane including the central axis of the cylinder. Lid 160 has a cavity 163 having a semi-circular cross-sectional shape, which is formed on the inner circumferential side of the lateral face 162. The top face 160a and the bottom face 160b are provided with approximately columnar protrusions 166 that protrude outward in the axial direction of lid 160. These protrusions 166 are inserted in the through holes 158 of the main casing 150, whereby the lid 160 is supported with the main casing 150 in a rotatable manner. In a protrusion 166, there is formed a through hole 168 of about 2 mm diameter. As well illustrated in FIGS. 4 and 8, the through hole 168 is placed eccentrically (near the periphery of the protrusion 166 in the illustrated example) on the opening side of lid 160 relative to the center of the approximately columnar shape.

Sticky roll 130 has a center hole 135 where the central axis of the cylinder is assumed. Into the center hole 135, a stick-like holding member 120 is press-fitted to form one body (a single unit). By this, a rolling member 110 is structured, comprising the sticky roll 130 and the holding member 120. The two ends of holding member 120 slightly protrude from the ends of sticky roll 130 in the axial direction. The two ends are inserted in through holes 168 formed in protrusions 166 of lid 160 to support the rolling member 110 (sticky roll 130) with the lid 160 in a freely rotatable manner.

Cleaner 100 is configured so that, by rotating the lid 160 relative to main casing 150, it can be in a state suited for the use or alternatively for the storage of cleaner 100. In particular, when cleaner 100 is not in use (not removing dirt), as shown in FIGS. 5 to 8, the cavity 163 in lid 160 is put in a state facing the inside of main casing 150 (in a closed state), whereby sticky roll 130 can be housed in casing 140. This can reduce unintentional deposition of dust and the like on sticky roll 130. When put in use, lid 160 is rotated to put the cavity 163 in a state facing the outside of main casing 150 (in an open state) as shown in FIGS. 1 to 4 so as to expose the sticky roll 130 to the outside, whereby cleaner 100 can be in a state suited for its use. In protrusions 166, the rotational axis of sticky roll 130 is placed eccentrically on the opening side of lid 160. By this, when lid 160 is in the open state, sticky roll 130 emerges from main casing 150 so that it can be easily applied to a surface subject to cleaning; and when lid 160 is in the closed state, it can take a compact form.

In cleaner 100, lid 160 is very easily opened and closed (rotated) and is easy to handle. Lid 160 is provided with a tab 164 in a central area of the length direction in order to make it easier to rotate lid 160 and to control the position (rotation angle) of lid 160. With the tab 164 abutted to the elongated faces 151a or 151b, the position of lid 160 can be stabilized.

The material forming the main casing 140 is not particularly limited. From the standpoint of the ease of molding, the light weight, etc., various resin materials can be preferably used. Examples include resin materials such as olefin resins including polyethylene and polypropylene, polyester resin, styrene resin, and acrylonitrile-butadiene-styrene (ABS) resin. These resin materials can be used singly as one species or in a combination of two or more species. Two or more species of resin materials can be used as a blend or as materials forming different areas. At an end of casing 140, a loop 142 is formed as part of the unit. The purpose of loop 142 is not particularly limited. Loop 142 may be useful in attaching cleaner 100 to various articles (e.g. an article subject to cleaning) with known straps, etc., or attaching ornaments or marking (such as a name tag, etc.) to the cleaner 100.

Figure 9:
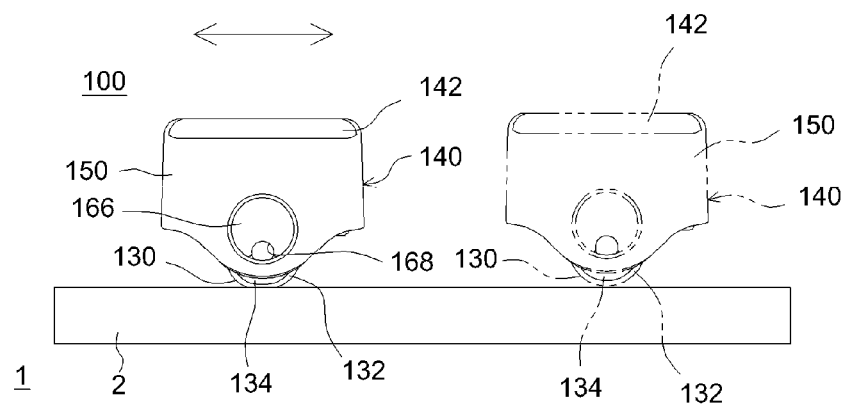
FIG. 9 illustrates an example of how the sticky cleaner according to an embodiment is used.

Described next is a use mode of cleaner 100 having the constitution described above. As shown in FIG. 9, cleaner 100 is used to remove organic dirt deposited on display 2 in portable device 1. Display 2 in portable device 1 has a smooth, flat surface. By an operator, sticky roll 130 of cleaner 100 in the open state is brought in contact with display 2 to apply a prescribed external force to cleaner 100. More specifically, with the main casing 150 held by hand, while pushing sticky roll 130 against display 2, cleaner 100 is moved (rolled) along the surface of display 2 in a direction perpendicular to the axis of sticky roll 130 (in the direction shown by the arrow in the drawing). By this, sticky roll 130 moves over display 2 while rotating. During this, the PSA layer 132 on the outer circumferential face of sticky roll 130 collects organic dirt (e.g. sebum dirt such as sebum-containing finger marks and fingerprints) present on display 2. By this means, cleaning (dirt removal) of display 2 is easily and certainly accomplished in the rotation direction of PSA sheet roll 130. The portable device in this embodiment is a tablet terminal whose display is entirely formed of tempered glass such as aluminosilicate glass although it is not limited to this as described earlier.

Here, sticky roll 130 is configured so that the outer circumferential face that comes in contact with the surface subject to cleaning (the display 2 here) has a hardness of 90 or lower. Thus, as shown in FIG. 9, by the pressure of sticky roll 130 pressing onto display 2, sticky roll 130 is deformed flat where it is in contact with display 2. This can increase the contact area between sticky roll 130 and display 2 as compared to a cleaner using a sticky roll (e.g. cleaner 90 drawn in imaginary lines in FIG. 9) having a higher hardness. As a result, if cleaner 100 is moved (rolled) at the same rate, the contact time can be increased between the display 2 and the PSA layer 132 placed on the outer circumferential face of sticky roll 130. This can bring about greater dirt-collecting performance.

With decreasing hardness of the outer circumferential face of sticky roll 130, the contact time between sticky roll 130 and the surface being cleaned tends to be longer. Thus, by decreasing the hardness of the outer circumferential face, greater dirt removability can be obtained. From such a standpoint, the hardness is preferably 75 or lower, more preferably 60 or lower, or yet more preferably 55 or lower. The minimum hardness is not particularly limited. For instance, the hardness can be zero when determined by the method described later in the working examples. From the standpoint of the ease of handling sticky roll 130 and prevention of damage caused by external forces, the hardness is usually suitably 1 or higher, preferably 3 or higher, or more preferably 5 or higher. With the hardness being 10 or higher, the surface of the PSA layer 132 can be more adequately press-bonded to the surface being cleaned, whereby the dirt-collecting ability can be enhanced. From such a standpoint, the hardness is usually suitably 15 or higher, preferably 25 or higher, more preferably 30 or higher, or yet more preferably 35 or higher. In a preferable embodiment, the hardness can be 40 or higher (e.g. 45 or higher).

In the art disclosed herein, the minimum thickness of the PSA layer 132 can be suitably selected in accordance with the purpose and embodiment without any particular limitations. From the standpoint of the organic dirt-collecting ability, the thickness of the PSA layer 132 can be, for instance, 10 μm or greater. It is usually suitably 25 μm or greater, preferably greater than 50 μm, or more preferably greater than 100 μm. From the standpoint of the performance retention against repeated use, etc., the thickness of the PSA layer 132 is advantageously greater than 150 μm, preferably greater than 200 μm, or more preferably greater than 300 μm. With increasing thickness of the PSA layer 132, the hardness of the outer circumferential face of sticky roll 130 tends to decrease. Thus, a large thickness of the PSA layer 132 can be advantageous in view of the dirt-collecting ability as well. In a preferable embodiment, the thickness of the PSA layer 132 can be 500 μm or greater, also 600 μm or greater, or even 700 μm or greater. The maximum thickness of the PSA layer 132 is not particularly limited. In view of making the cleaner 100 smaller and lighter, the thickness of the PSA layer 132 is suitably 20 mm or less, more suitably 15 mm or less, preferably 10 mm or less. From the standpoint of the productivity and the ease of handling the sticky roll 130, the thickness of the PSA layer 132 is preferably 3 mm or less, or more preferably 2 mm or less (e.g. 1 mm or less). The maximum and minimum values of the thickness of the PSA layer 132 can be preferably applied to the thickness of the PSA in an embodiment where the sticky roll has no support member on the back face of the PSA (e.g. an embodiment where the entirety of the sticky roll is a molded body formed from the PSA). In this embodiment, when the sticky roll is cylindrical (tubular), the thickness of the PSA refers to the thickness of the cylinder (the thickness of the side wall). When the sticky roll has a solid columnar shape, it refers to the radius of the column.

In a configuration according to the present embodiment, the minimum thickness of the support member 134 is not particularly limited. From the standpoint of obtaining greater effects (e.g. adjustment of hardness, enhancement of handling properties, etc.) of the support member 134 placed on the backside of the PSA layer 132, the thickness of the support member 134 is usually preferably greater than 100 μm, or more preferably 200 μm or greater. The maximum thickness of the support member 134 is not particularly limited and can be, for instance, 30 mm or less. Here, when the support member is cylindrical (tubular), the thickness of the support member 134 refers to the thickness of the cylinder. When the support member has a solid columnar shape, it refers to the radius of the column.

The outer diameter (diameter) of sticky roll 130 is not particularly limited. From the standpoint of the dirt-collecting ability and the performance retention against repeated use, the outer diameter of sticky roll 130 is usually suitably 3 mm or greater, or preferably 5 mm or greater. When it is used on a portable device such as a tablet-type information terminal, from the standpoint of the usability and portability, the outer diameter is preferably 50 mm or less (e.g. 35 mm or less, typically 30 mm or less). In a preferable embodiment, the outer diameter can be 20 mm or less, also 15 mm or less, or even 10 mm or less. The cleaner disclosed herein may have high dirt-collecting ability and high performance retention against repeated use; and therefore, even with a small outer diameter, it can produce sufficient performance.

The method for fabricating a sticky roll 130 having a PSA layer 132 on the outer circumferential face of a cylindrical support member 134 is not particularly limited. A heretofore known method can be suitably employed. For instance, it can be fabricated by placing a PSA composition for forming a PSA layer and a composition for forming a support member in a general extruder to obtain a long tubular extrudate, and cutting the extrudate to a suitable length. Alternatively, it can also be fabricated by forming a long tubular support member 134 and forming a PSA composition around the support member 134 by extrusion or coating.

Second Embodiment

Figure 10:
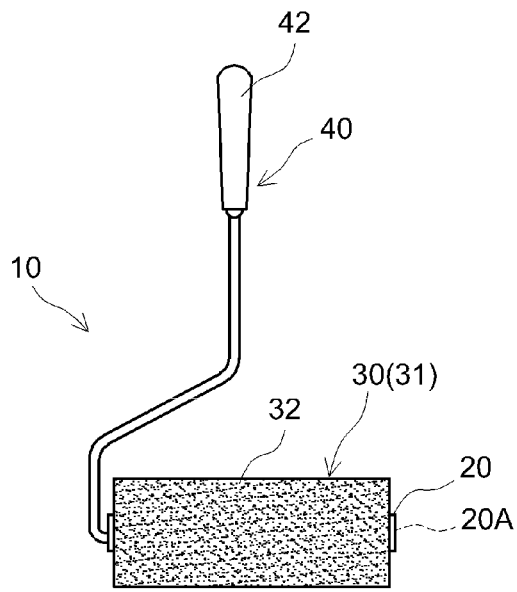
FIG. 10 shows a front view of the sticky cleaner according to another embodiment.
Figure 11:
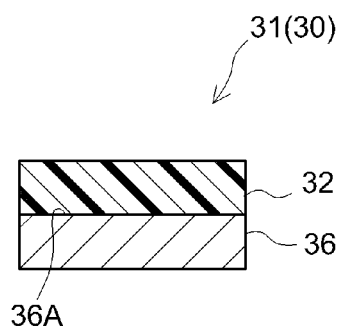
FIG. 11 shows a cross-sectional view of the dirt-collecting member of the sticky cleaner according to another embodiment.

As shown in FIGS. 10 and 11, the cleaner 10 according the present embodiment comprises a cylindrical holding member (core) 20 and a PSA sheet roll 30 held on the outer periphery of holding member 20. Holding member 20 and PSA sheet roll 30 are assembled to form a cylindrical rolling member. The holding member material is not particularly limited. A holding member made of a polyolefin or other synthetic resin as well as paper can be preferably used.

Cleaner 10 further comprises a grip member 40 in a form of a pole that supports holding member 20 in a freely rotatable manner. In particular, holding member 20 has a center hole (not shown in the drawings) formed where the central axis of the cylinder is located. A terminal section (one end) of grip member 40 is inserted through the center hole, whereby holding member 20 is installed on grip member 40 in a freely rotatable manner. To the other end of grip member 40, a handle 42 is attached. The materials of grip member and handle are not particularly limited. For instance, metal or synthetic resin pieces can be used.

PSA sheet roll 30 in cleaner 10 is formed by winding a PSA sheet 31 that forms the dirt-collecting member. In particular, PSA sheet 31 is configured as a single-faced PSA sheet 31 comprising, as shown in FIG. 11, a support substrate (support) 36 in a form of a long sheet (band) and a PSA layer 32 placed on one face 36A of the support substrate 36. The PSA layer 32 is typically formed of an acrylic PSA. PSA sheet 31 is wound with the PSA layer 32 on the outside and formed as a PSA sheet roll (dirt-collecting member) 30.

PSA sheet roll 30 is configured so that the outer circumferential face has a hardness of 90 or less. As for favorable ranges of the hardness, the same ranges as for the outer circumferential face of sticky roll 130 of cleaner 100 in the first embodiment can be applied. The materials and the thicknesses of the PSA layer 32 and the support substrate 36 can be suitably selected so that the hardness is in a suitable range. For instance, as the support substrate 36, a soft acrylic resin sheet, a foam sheet and the like can be preferably used. The size of PSA sheet roll 30 is not particularly limited. For instance, its outer diameter (outer diameter (diameter) before put in use) is preferably comparable to that of sticky roll 130 of cleaner 100 in the first embodiment.

The PSA sheet forming the PSA sheet roll may be provided with continuous cut lines, intermittent cut lines (perforation), slits and the like as a cutting means for efficiently refreshing the PSA layer surface (the outer surface of the dirt-collecting member). In this case, the cutting means is preferably provided at intervals corresponding to approximately the length of the circumference of the PSA sheet roll.

The cleaner in the first and second embodiments comprise grip members that support the rolling members in a freely rotatable manner so that the dirt-collecting members are rotated to collect dirt; however, the cleaner disclosed herein is not limited to these embodiments. For instance, the grip member may be directly or indirectly joined (connected or detachably joined) to the dirt-collecting member. In an example of such a sticky cleaner, a columnar or cuboid PSA body is fastened to one end of a pole-shaped grip member. Alternatively, the grip member may have a flat portion and the dirt-collecting member may be fastened to one face of the flat portion.

The sticky cleaner disclosed herein may be formed without a grip member, but solely with one, two or more dirt-collecting members. Examples of such a sticky cleaner include a cleaner formed solely with a dirt-collecting member in a form of a sphere, column, cylinder, hexahedron (e.g. cuboid), sheet, etc. An example of the cleaner formed solely with a dirt-collecting member is described next.

Third Embodiment

Figure 12:
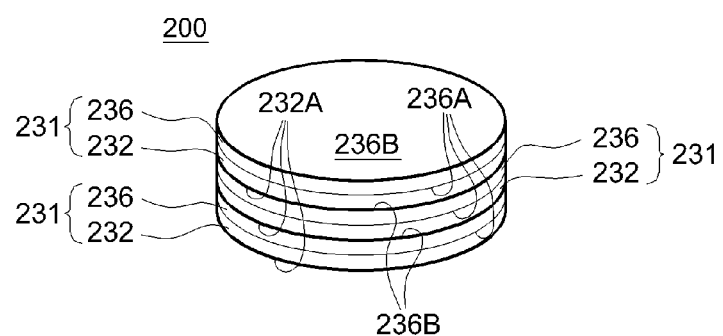
FIG. 12 shows a perspective view of the sticky cleaner according to yet another embodiment.

As shown in FIG. 12, cleaner 200 according to the present embodiment encompasses an adhesively single-faced PSA sheet (dirt-collecting member) 231 that comprises a support substrate sheet (support member) 236 and a PSA layer 232 placed on one face 236A of the support substrate 236. Cleaner 200 can be produced as a laminate body of a PSA sheet 231 having a desirable flat shape (a die-cut shape) obtained by laminating several layers of the PSA sheet 231 so that the other face 236B of support substrate 236 of each layer of the PSA sheet 231 makes contact with the adhesive face 232A of the next layer of the PSA sheet 231, followed by die-cutting the laminate body to obtain a desirable shape (a circular shape in the example shown in FIG. 12). Here, the other face 236B of support substrate 236 is a release face from which the surface (adhesive face) 232A of the PSA sheet 231 can be separated. When using the cleaner 200, dirt removal of a surface subject to cleaning is carried out by peeling the outermost layer of the PSA sheet 231 of the laminate body from the other face 236B of the next layer of the PSA sheet 231, pressing the exposed adhesive face onto the surface subject to cleaning, and then releasing it from the surface.

The PSA sheet 231 is configured so that the adhesive face 232A has a hardness of 90 or less. As for favorable ranges of the hardness, the same ranges as the outer circumferential face of sticky roll 130 of cleaner 100 in the first embodiment can be applied. The materials and the thicknesses of the PSA layer 232 and the support substrate 236 can be suitably selected so that the hardness is in a suitable range. For instance, as the support substrate 236, a soft acrylic resin sheet, a foam sheet and the like can be preferably used.

As modified examples, each of the first, second and third embodiments described above can be preferably implemented in an embodiment where the dirt-collecting member in each embodiment has at least one of the following characteristics: (1) the PSA provided to the dirt-collecting member has a triolein absorption of 0.05 mg/mm$^3$ or greater; and (2) in the area of the dirt-collecting member that comes in contact with the surface subject to cleaning, the triolein absorption (e.g. the surface absorption by the PSA layer 132 in the first embodiment) is 2 mg or greater per cm$^2$ area of the PSA. The dirt-collecting member with such great triolein absorption can bring about a sticky cleaner that shows good organic dirt removability (especially, sebum dirt removability). In these modified examples, the hardness of the dirt-collecting member is not particularly limited. The modified examples can be preferably implemented in an embodiment where either one or each of the characteristics (1) and (2) is satisfied, and the dirt-collecting member has a hardness of 90 or less.

<PSA>

The dirt-collecting member in the sticky cleaner disclosed herein has a PSA in an area that makes contact with an article surface (a surface subject to cleaning). The material and the thickness of the PSA can be selected so that the dirt-collecting member can produce good organic dirt removability. For instance, an acrylic PSA, a rubber-based PSA (e.g. a natural rubber-based PSA), a urethane-based PSA and the like can be used. Here, the acrylic PSA refers to a PSA that comprises an acrylic polymer as the base polymer (the primary component among the polymers, i.e. a component accounting for more than 50% by weight). The same applies to other PSAs as well.

In a preferable embodiment of the cleaner disclosed herein, the cleaner comprises a PSA (an acrylic PSA) comprising an acrylic polymer as the base polymer in an area that makes contact with a surface subject to cleaning. The acrylic polymer can be synthesized from a starting monomer mixture that comprises, as the primary monomer, an alkyl (meth)acrylate having an alkyl group. Here, the primary monomer refers to a monomer that accounts for more than 50% by weight of all the monomers. As used herein, the term "(meth)acrylate" comprehensively refers to acrylate and methacrylate. Similarly, the terms "(meth) acryloyl" and "(meth)acryl" comprehensively refer to acryloyl and methacryloyl and to acryl and methacryl, respectively.

When the starting monomer mixture comprises two or more species of monomers, the acrylic polymer may be a random copolymer, a block copolymer, a graft copolymer, etc. From the standpoint of the ease of production and the handling properties, preferable acrylic polymers include a random copolymer and a block copolymer. For the acrylic polymer, solely one species or a combination of two or more species can be used.

[Acrylic Random Copolymer]

The acrylic polymer according to a preferable embodiment comprises an acrylic random copolymer synthesized from a starting monomer mixture that comprises an alkyl (meth)acrylate having an alkyl group as the primary monomer. As the alkyl (meth)acrylate, for instance, a compound represented by a general formula (1) shown below can be suitably used:

$$CH_2=CR^1COOR^2 \qquad (1);$$

Here, R$^1$ in the general formula (1) is a hydrogen atom or a methyl group. R$^2$ is an alkyl group having 1 to 20 carbon atoms (hereinafter, such a range of the number of carbon atoms may be indicated as "C$_{1-20}$"). From the standpoint of the storage elastic modulus of the PSA, etc., an alkyl (meth)acrylate having a C$_{1-14}$ (e.g. C$_{1-10}$) alkyl group is preferable. The alkyl group can be acyclic (linear or branched) or may include a cyclic structure.

Examples of the alkyl (meth)acrylate having a C$_{1-20}$ alkyl group include methyl (meth)acrylate, ethyl (meth)acrylate, n-propyl (meth)acrylate, isopropyl (meth)acrylate, n-butyl (meth)acrylate, isobutyl (meth)acrylate, s-butyl (meth)acrylate, t-butyl (meth)acrylate, n-pentyl (meth)acrylate, isoamyl (meth)acrylate, neopentyl (meth)acrylate, n-hexyl (meth)acrylate, cyclohexyl (meth)acrylate, n-heptyl (meth)acrylate, n-octyl (meth)acrylate, isooctyl (meth)acrylate, 2-ethylhexyl (meth)acrylate, n-nonyl (meth)acrylate, isononyl (meth)acrylate, decyl (meth)acrylate, isodecyl (meth)acrylate, bornyl (meth)acrylate, isobornyl (meth)acrylate, undecyl (meth)acrylate, lauryl (meth)acrylate, tridecyl (meth)acrylate, tetradecyl (meth)acrylate, pentadecyl (meth)acrylate, stearyl (meth)acrylate, heptadecyl (meth)acrylate, octadecyl (meth)acrylate, nonadecyl (meth)acrylate and eicosyl (meth)acrylate. These alkyl (meth)acrylates may be used singly as one species or in a combination of two or more species.

From the standpoint of the removability of organic dirt (e.g. sebum dirt), the starting monomer mixture preferably comprises, as the primary monomer, an alkyl (meth)acrylate having an acyclic C$_{4-14}$ alkyl group. It is more preferable to comprise an alkyl (meth)acrylate having an acyclic C$_{6-12}$ alkyl group as the primary monomer. By this, greater organic dirt removability tends to be obtained. Favorable examples of such an alkyl (meth)acrylate include 2-ethylhexyl acrylate (2EHA), isooctyl acrylate (IOA), isononyl acrylate (INA) and lauryl methacrylate. Among them, 2EHA, IOA and INA are preferable, with 2EHA being particularly preferable.

The ratio of the primary monomer in all the monomers forming the acrylic random copolymer is preferably 60% by weight or higher, more preferably 80% by weight or higher, or yet more preferably 90% by weight or higher. The maximum ratio of the primary monomer in all the monomers is not particularly limited. From the standpoint of facilitating the adjustment of the adhesive properties (adhesive strength, cohesive strength, etc.), it is usually preferably 99% by weight or less (e.g. 98% by weight or less, typically 95% by weight or less). The acrylic random copolymer can be a polymerization product of essentially just the primary monomer.

For purposes of adjusting the adhesive properties, etc., the starting monomer mixture used in polymerization of the acrylic random copolymer may further comprise, in addition to the primary monomer, a secondary monomer (possibly an oligomer) copolymerizable with the primary monomer. As such a secondary monomer, a monomer having a functional group (or "functional group-containing monomer" hereinafter) can be cited. The functional group-containing monomer can be added to incorporate crosslinking points into the acrylic polymer to facilitate adjustment of the adhesive properties (adhesive strength, cohesive strength, etc.). Examples of such a functional group-containing monomer include a carboxy-group-containing monomer, an acid-anhydride-group-containing monomer, a hydroxy-group-containing monomer, an amide-group-containing monomer, an amino-group-containing monomer, an epoxy-group (glycidyl group)-containing monomers, an alkoxy-group-containing monomers, and an alkoxysilyl-group-containing monomers. These can be used singly as one species or in a combination of two or more species. Among these, for their abilities to favorably introduce crosslinking points into the acrylic polymer and also for easy adjustment of the PSAs crosslink density, preferable functional group-containing monomers include a carboxy group-containing monomer, a hydroxy group-containing monomer and an epoxy group-containing monomer, with the carboxy-group-containing monomer and the hydroxy-group-containing monomer being more preferable.

Examples of a carboxy-group-containing monomer include ethylenic unsaturated monocarboxylic acids such as acrylic acid, methacrylic acid, crotonic acid, carboxyethyl (meth)acrylate, and carboxypentyl (meth)acrylate; and ethylenic unsaturated dicarboxylic acids such as itaconic acid, maleic acid, fumaric acid, and citraconic acid. Among these, acrylic acid and/or methacrylic acid are preferable, and acrylic acid is especially preferable.

Examples of an acid-anhydride-group-containing monomers include acid anhydrides of the ethylenic unsaturated dicarboxylic acids listed above such as maleic acid anhydride, and itaconic acid anhydride.

Examples of a hydroxy-group-containing monomer include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate; and unsaturated alcohols such as N-methylol(meth)acrylamide, vinyl alcohol, allyl alcohol, 2-hydroxyethyl vinyl ether, 4-hydroxybutyl vinyl ether, and diethylene glycol monovinyl ether.

Examples of an amide-group-containing monomer include (meth)acrylamide, N,N-dimethyl(meth)acrylamide, N-butyl(meth)acrylamide, N-methylol(meth)acrylamide, N-methylolpropane(meth)acrylamide, N-methoxymethyl (meth)acrylamide, and N-butoxymethyl(meth)acrylamide.

Examples of an amino-group-containing monomer include aminoethyl (meth)acrylate, N,N-dimethylaminoethyl (meth)acrylate, and t-butylaminoethyl (meth)acrylate.

Examples of an epoxy-group (glycidyl group)-containing monomer include glycidyl (meth)acrylate, methylglycidyl (meth)acrylate, and allyl glycidyl ether.

Examples of an alkoxy-group-containing monomer include methoxyethyl (meth)acrylate, ethoxyethyl (meth)acrylate.

Examples of an alkoxysilyl-group-containing monomer include 3-(meth)acryloxypropyltrimethoxysilane, 3-(meth)acryloxypropyltriethoxysilane, 3-(meth)acryloxypropylmethyldimethoxysilane, and 3-(meth)acryloxypropylmethyldiethoxysilane.

When a functional group-containing monomer as described above is used, the functional group-containing monomer (preferably a carboxyl group-containing monomer) is preferably added at 1% to 10% by weight (e.g., 2% to 8% by weight, typically 3% to 7% by weight) of all the monomers.

To increase the cohesive strength of the acrylic polymer, etc., another monomer besides the functional-group-containing monomer can be included as a secondary monomer. Examples of such a monomer include vinyl-ester-based monomers such as vinyl acetate, and vinyl propionate; and aromatic vinyl compounds such as styrene, substituted styrenes (α-methylstyrene, etc.), and vinyl toluene.

The method for synthesizing the acrylic polymer (acrylic random copolymer) from the monomer mixture is not particularly limited. A general polymerization method heretofore known can be suitably employed, such as heretofore known solution polymerization, emulsion polymerization, bulk polymerization, and suspension polymerization. The embodiment of the polymerization is not particularly limited. It can be carried out with suitable selection of a heretofore known monomer supply method, polymerization conditions (temperature, time, pressure, etc.), and other components (polymerization initiator, surfactant, etc.) used besides the monomer(s).

The polymerization initiator is not particularly limited. Examples include an azo-based initiator such as 2,2'-azobisisobutylonitrile; a peroxide-based initiator such as benzoyl peroxide; a substituted ethane-based initiator such as phenyl-substituted ethane; and a redox-based initiator by a combination of a peroxide and a reducing agent (e.g. a combination of a peroxide and sodium ascorbate). The amount of polymerization initiator used can be suitably selected in accordance with the species of polymerization initiator, the monomer species (the composition of the monomer mixture) and so on. It is usually suitably selected from a range of, for instance, about 0.005 part to 1 part by weight to 100 parts by weight of all the monomers. The polymerization temperature can be, for example, around 20° C. to 100° C. (typically 40° C. to 80° C.).

The weight average molecular weight (Mw) of the acrylic random copolymer is not particularly limited. For instance, an acrylic random copolymer with Mw of about $30 \times 10^4$ to $100 \times 10^4$ can be favorably used as the base polymer. In a preferable embodiment, the PSA may be formed from a solvent-based PSA composition that comprises an acrylic random copolymer with Mw in this range as the base polymer.

[Acrylic Block Copolymer]

The acrylic polymer according to a preferable embodiment comprises an acrylic block copolymer having a hard segment (A) (or a "A-block" hereinafter) and a soft segment (B) (or a "B-block" hereinafter) in one molecule. In the structure of the acrylic block copolymer, the hard segment (A) refers to the relatively hard block in relation to the soft segment (B) in the acrylic copolymer. The soft segment (B) refers to the relatively soft block in relation to the hard segment (A) in the structure of the acrylic block copolymer.

The acrylic block copolymer may show characteristics of thermoplastic polymers (typically thermoplastic elastomers). The PSA disclosed herein comprises the acrylic block copolymer as the base polymer and thus may be a PSA suited for hot melt molding (i.e. a hot melt PSA). Examples of the hot melt molding include extrusion (e.g. co-extrusion with a support member) and injection molding of the PSA and hot melt coating of the PSA. The hot melt PSA is preferable from the standpoint of reducing environmental stress, etc., because the amount of organic solvents used can be reduced as compared with a general organic solvent-based acrylic PSA.

Herein, the acrylic block copolymer refers to a polymer having a block structure that comprises, as a monomer unit (monomeric component) constituting the copolymer, a monomer unit derived from a monomer having at least one (meth)acryloyl group per molecule (or an "acrylic monomer" hereinafter). In other words, it refers to a block copolymer comprising a monomer unit derived from an acrylic monomer. For instance, in a preferable acrylic block copolymer, 50% by weight or more of all monomer units are derived from an acrylic monomer. Such an acrylic block copolymer can be preferably synthesized from starting monomer(s) comprising, as the primary monomer, an alkyl (meth)acrylate having an alkyl group.

A preferable acrylic block copolymer comprises at least one acrylate block (which hereinafter may be referred to as an Ac block) and at least one methacrylate block (which hereinafter may be referred to as an MAc block). For instance, a preferable block copolymer has a structure in which Ac blocks and MAc blocks are positioned alternately. The total block number of Ac blocks and MAc blocks comprised in one polymer molecule can be about 2.5 to 5 in average (e.g. about 2.7 to 3.3, typically about 3).

In typical, the Ac block preferably comprises an alkyl acrylate as the primary monomer. In other words, 50% by weight or more of all monomeric units constituting the Ac block are preferably monomer units derived from an alkyl acrylate. 75% by weight or more (e.g. 90% by weight or more) of the monomer units can be derived from an alkyl acrylate as well. In a preferable embodiment, the Ac block in the acrylic block copolymer is a polymer essentially formed of one, two or more species (typically one species) of alkyl acrylate. Alternatively, the Ac block may be a copolymer of an alkyl acrylate and other monomer (e.g. an alkyl methacrylate, etc.).

An example of the Ac block-constituting alkyl acrylate is an alkyl acrylate having 1 to 20 (preferably 4 to 14, e.g. 6 to 12) carbon atoms in its alkyl group. Examples include methyl acrylate, ethyl acrylate, n-propyl acrylate, isopropyl acrylate, n-butyl acrylate (BA), isobutyl acrylate, tert-butyl acrylate, n-pentyl acrylate, n-hexyl acrylate, n-heptyl acrylate, n-octyl acrylate, isooctyl acrylate (IOA), 2-ethylhexyl acrylate (2EHA), n-nonyl acrylate, isononyl acrylate (INA), decyl acrylate, lauryl acrylate, and stearyl acrylate. These can be used singly as one species or in a combination of two or more species.

In a preferable embodiment, 50% by weight or more of monomers constituting the Ac block is an alkyl acrylate having 4 to 14 carbon atoms in its alkyl group. The ratio of alkyl acrylate having 4 to 14 carbon atoms in alkyl group can be 75% by weight or greater or can be essentially 100% by weight (e.g. greater than 99% by weight, but 100% by weight or less). For instance, it is preferable to use a structure in which the monomer unit(s) constituting the Ac block essentially consist of BA or 2EHA, or comprise the two species, BA and 2EHA, and so on. The weight ratio of BA to 2EHA is not particularly limited. For instance, it can be 10/90 to 90/10, preferably 80/20 to 20/80, or more preferably 30/70 to 70/30, for example, 60/40 to 40/60.

It is typically preferable that the MAc block comprises an alkyl methacrylate as the primary monomer. Of all the monomer units constituting the MAc, 75% by weight or more (e.g. 90% by weight or more) can be derived from an alkyl methacrylate. In a preferable embodiment, the MAc block in the acrylic block copolymer is essentially formed of one, two or more species (typically one species) of alkyl methacrylate. Alternatively, the MAc block may be a copolymer of an alkyl methacrylate and other monomer (e.g., an alkyl acrylate).

The alkyl methacrylate constituting the MAc block may be an alkyl methacrylate whose alkyl group has 1 to 20 (preferably 1 to 14) carbon atoms. Specific examples thereof include methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, n-heptyl methacrylate, n-octyl methacrylate, isooctyl methacrylate, 2-ethylhexyl methacrylate, n-nonyl methacrylate, isononyl methacrylate, decyl methacrylate, lauryl methacrylate, stearyl methacrylate, etc. These can be used singly as one species or in a combination of two or more species.

In a preferable embodiment, 50% by weight or more of the monomers constituting the MAc block is an alkyl methacrylate having an alkyl group with 1 to 4 (preferably 1 to 3) carbon atoms. The ratio of the alkyl methacrylate having 1 to 4 carbon atoms in its alkyl group can be 75% by weight or greater, or essentially 100% by weight (e.g. greater than 99% by weight, but 100% by weight or less). Especially preferable alkyl methacrylates include methyl methacrylate (MMA) and ethyl methacrylate (EMA). For example, the monomers preferably employed may consist essentially of MMA alone, EMA alone, both MMA and EMA, or the like.

The acrylic block copolymer may be a copolymer comprising A blocks (hard segments (A)) and B blocks (soft segments (B)) positioned alternately such as AB structure, ABA structure, ABAB structure, ABABA structure, etc., with the A block having been formed of a polymer having a rigid structure with excellent cohesive strength and elasticity, and the B block having been formed of a polymer having a flexible structure with excellent viscosity. A PSA comprising as its base polymer an acrylic block copolymer having such a structure may form a PSA layer combining cohesive strength and elasticity as well as viscosity at high levels. A PSA having such a composition can be preferably used as a hot melt PSA. An acrylic block copolymer having a structure (such as ABA structure, ABABA structure, etc.) with A blocks at both termini of the molecule can be preferably used. An acrylic block copolymer having such a structure is preferable because it is likely to have a good balance of cohesion and thermoplasticity. From the standpoint of reducing the melt viscosity, etc., an acrylic block copolymer having a linear structure is advantageous as compared to a species having a stellar structure or a branched structure.

When the acrylic block copolymer comprises two or more A blocks, the compositions, molecular weights (polymerization degrees), structures, etc., of these A blocks can be the same with or different from each other. When the acrylic block copolymer comprises two or more B blocks, the same applies to the B blocks.

As the A block, a MAc block as those described above can be preferably used. As the B block, an Ac block as those described above can be preferably used. In a preferable embodiment, the acrylic block copolymer is a triblock copolymer having a structure of MAc-Ac-MAc (ABA structure). For instance, can be preferably used a triblock copolymer with two MAc blocks having essentially identical monomer compositions.

A preferable acrylic block copolymer in the art disclosed herein has, as the soft segment (B), an Ac block comprising an alkyl acrylate having 6 or more (e.g. 6 to 12) carbon atoms in its alkyl group. In the monomer units constituting the Ac block, the ratio of the alkyl acrylate having 6 or more carbon atoms in its alkyl group can be, for instance, 10% by weight or higher, or it is preferably 20% by weight or higher, more preferably 30% by weight or higher, or yet more preferably 40% by weight or higher.

In a preferable embodiment, as the soft segment (B), an acrylic block copolymer that has an Ac block comprising as its primary monomer the alkyl acrylate having 6 or more (e.g. 6 to 12) carbon atoms in its alkyl group can be used. In other words, it is preferable that one, two or more species of alkyl acrylate having 6 or more carbon atoms in its alkyl group account for 50% by weight or more of the monomer units constituting the Ac block. Of the monomer units that constitute the Ac block, the ratio of alkyl acrylate having 6 or more carbon atoms in its alkyl group can be, for instance, 55% by weight or higher, or 60% by weight or higher. It is preferably 70% by weight or higher, more preferably 85% by weight or higher, yet more preferably 95% by weight or higher, or it can be essentially 100% by weight as well. For instance, a preferable acrylic block copolymer has, as the soft segment (B), an Ac block constituted solely with 2EHA as the monomer unit.

Preferable examples of the alkyl acrylate having 6 or more carbon atoms in its alkyl group include 2-ethylhexyl acrylate (2EHA), n-octyl acrylate, isononyl acrylate and n-hexyl acrylate.

An acrylic block copolymer that has as the soft segment (B) an Ac block comprising an alkyl acrylate having 6 or more carbon atoms in its alkyl group may have an excellent organic dirt-collecting ability. Thus, for instance, it may bring about a higher fingerprint removal rate in the fingerprint removability test described later.

The acrylic block copolymer that has as the soft segment (B) an Ac block comprising an alkyl acrylate having 6 or more carbon atoms in its alkyl group may have excellent compatibility with plasticizer. In a PSA having a composition that includes the copolymer and a plasticizer, this is preferable from the standpoint of reducing the bleeding (bleed-out) of the plasticizer. Because it allows suitable inclusion of a greater amount of plasticizer, it leads to advantages such as permitting great latitude in selecting the amount of plasticizer added and easy adjustment of the adhesive strength.

In another preferable embodiment, it is possible to use an acrylic block copolymer that has, as the soft segment (B), an Ac block formed with monomer units that comprise an alkyl acrylate whose alkyl group has 6 or more (e.g. 6 to 12, typically 6 to 9) carbon atoms and an alkyl acrylate whose alkyl group has 2 to 5 (e.g. 3 to 4, typically 4) carbon atoms at a weight ratio of 20/80 to 80/20 (more preferably 30/70 to 70/30, or yet more preferably 40/60 to 60/40, e.g. 45/55 to 55/45). Such an acrylic block copolymer may have well-balanced organic dirt removability and cohesiveness. For instance, it is preferable to use an acrylic block copolymer that has, as the soft segment (B), an Ac block formed with monomer units that comprise 2EHA and BA at an aforementioned weight ratio. The monomer units may be formed solely from 2EHA and BA.

The weight ratio of hard segment (A) to soft segment (B) is not particularly limited in the acrylic block copolymer. For instance, the weight ratio (A/B) of hard segment (A) to soft segment (B) can be in a range of 4/96 to 90/10, or it is usually suitably in a range of 7/93 to 70/30 or preferably in a range of 10/90 to 50/50 (e.g. more preferably 15/85 to 40/60, e.g. 15/85 to 25/75). In the acrylic block copolymer comprising two or more hard segments (A), the ratio of total weight of these hard segments (A) to weight of soft segment (B) is preferably in these ranges. The same applies to the acrylic block copolymer comprising two or more soft segments (B). When the ratio of hard segment (A) (e.g. MAc block) is high, the adhesive strength tends to decrease, likely providing easy-release properties. When the ratio of soft segment (B) (e.g. Ac block) is high, the organic dirt-collecting ability tends to increase.

In a preferable example of the acrylic block copolymer disclosed herein, the starting monomers corresponding to all the monomer units constituting the acrylic block copolymer comprise an alkyl (meth)acrylate (X) having 1 to 3 carbon atoms in its alkyl group and an alkyl (meth)acrylate (Y) having 6 or more (e.g. 6 to 12) carbon atoms in its alkyl group. The weight ratio (X/Y) of alkyl (meth)acrylate (X) to alkyl (meth)acrylate (Y) can be, for instance, 4/96 to 90/10. An acrylic block copolymer with the weight ratio being 7/93 to 70/30 is preferable, a species with 10/90 to 50/50 is more preferable, a species with 15/85 to 40/60 is yet more preferable, and a species with 15/85 to 30/70 (e.g. 15/85 to 25/75) is particularly preferable. When the ratio of alkyl (meth)acrylate (X) is high, the adhesive strength tends to decrease, likely providing easy-release properties. When the ratio of alkyl (meth)acrylate (Y) is high, the organic dirt-collecting ability tends to increase. As the alkyl (meth)acrylate (X), an alkyl methacrylate having 1 to 3 carbon atoms in its alkyl group is preferable. As the alkyl (meth)acrylate (Y), an alkyl acrylate having 6 or more (e.g. 6 to 12) carbon atoms in its alkyl group is preferable.

In another preferable example of the acrylic block copolymer disclosed herein, the starting monomers corresponding to all the monomer units constituting the acrylic block copolymer comprise methyl methacrylate (MMA) and 2-ethylhexyl acrylate (2EHA) at a weight ratio (MMA/2EHA) of their contents of 4/96 to 90/10. An acrylic block copolymer with the weight ratio being 7/93 to 70/30 is preferable, a species with 10/90 to 60/40 is more preferable, a species with 20/80 to 50/50 is yet more preferable, and a species with 25/75 to 40/60 (e.g. 25/75 to 35/65) is particularly preferable. When the MMA content is high, the adhesive strength tends to decrease, likely providing easy-release properties. When the 2EHA content is high, the organic dirt-collecting ability tends to increase.

The composition of monomer units constituting an acrylic block copolymer can be determined based on the results of NMR analysis. In particular, the NMR analysis can be carried out, using, for instance, AVAVCEIII-600 (with Cryo Probe) available from Bruker Biospin as the NMR system, under the conditions shown below. For instance, the weight ratio of MMA to 2EHA in the starting monomers can be determined based on the ratio of integrated intensities of peaks at 4.0 ppm (2EHA1) and 3.6 ppm (MMA1) in the $^1$H NMR spectrum.

[NMR Analysis Conditions]
Measurement frequency: $^1$H, 600 MHz
Flip angle: 30°
Measurement solvent: $CDCl_3$
Measurement temperature: 300 K
Standard chemical shift: measurement solvent ($CDCl_3$, $^1$H: 7.25 ppm)

The acrylic block copolymer's Mw is not particularly limited. For instance, an acrylic block copolymer having a Mw of about $3 \times 10^4$ to $30 \times 10^4$ can be preferably used. Usually, the acrylic block copolymer has a Mw in a range of preferably about $3.5 \times 10^4$ to $25 \times 10^4$ or more preferably in a range of about $4 \times 10^4$ to $20 \times 10^4$ (e.g., $4.5 \times 10^4$ to $15 \times 10^4$). A higher Mw of the acrylic block copolymer is advantageous from the standpoint of increasing the adhesive properties (e.g. cohesion) and increasing the organic dirt-collecting ability. With increasing Mw of the acrylic block copolymer, the amount of plasticizer that can be suitably included tends to increase. On the other hand, a low Mw of the acrylic block copolymer is advantageous from the standpoint of reducing the viscosity (e.g. melt viscosity) of the PSA. It is particularly meaningful to have lower melt viscosity in an embodiment where the PSA layer is formed by hot-melt application of the PSA.

The Mw of an acrylic block copolymer herein refers to the value based on standard polystyrene that is determined by gel permeation chromatography (GPC) with respect to a sample prepared by dissolving the copolymer in tetrahydrofuran (THF). In particular, the GPC measurement can be performed, using, for instance, trade name "HLC-8120GPC" available from Tosoh Corporation as the GPC measurement system, under the conditions shown below.

[GPC Measurement Conditions]
Columns: available from Tosoh Corporation, TSK gel Super HZM-H/HZ4000/HZ3000/HZ2000
Column size: 6.0 mm I.D.×150 mm each
Eluent: THF Flow rate: 0.6 mL/min
Detector: differential refractometer (RI)
Column temperature (measurement temperature): 40° C.
Sample concentration: about 2.0 g/L (THF solution)
Sample injection volume: 20 µL In the acrylic block copolymer in the art disclosed herein, a monomer (other monomer) other than an alkyl acrylate and an alkyl methacrylate may be copolymerized. Examples of the other monomer include vinyl compounds having functional groups such as alkoxy group, epoxy group, hydroxy group, amino group, amide group, cyano group, carboxy group, acid anhydride group, etc.; vinyl esters such as vinyl acetate; aromatic vinyl compounds such as styrene; vinyl group-containing heterocyclic compounds such as N-vinylpyrrolidone and the like. Alternatively, it can be an alkyl acrylate having a structure with an acryloyl group coupled to a fluorinated alkyl group, a fluorinated alkyl acrylate and a fluorinated alkyl methacrylate. The other monomer may be used, for instance, to adjust the properties (adhesive properties, ease of molding, etc.) of the PSA layer and its content is suitably 20% by weight or less (e.g. 10% by weight or less, typically 5% by weight or less) of all the monomers constituting the acrylic block copolymer. In a preferable embodiment, the acrylic block copolymer is essentially free of the other monomers. For instance, in a preferable acrylic block copolymer, the other monomer content is less than 1% by weight (typically 0 to 0.5% by weight) of all monomers or under the detection limit.

Such an acrylic block copolymer can be readily synthesized by a known method (e.g. see Japanese Patent Application Publication Nos. 2001-234146 and H11-323072), or a commercial product is readily available. Examples of the commercial product include trade name "KURARITY" series (e.g., those with product numbers LA2140e, LA2250, etc.) available from Kuraray Co., Ltd., trade name "NABSTAR" available from Kaneka Corporation, and the like. As the method for synthesizing the acrylic block copolymer, living polymerization method can be preferably employed. According to living polymerization, while keeping the weatherability inherent in the acrylic polymer, because of the excellent structure control unique to the living polymerization, an acrylic block copolymer having excellent thermoplasticity can be synthesized. Since the molecular weight distribution can be controlled in a narrow range, insufficient cohesion caused by the presence of low molecular weight components can be reduced to obtain an easily releasable PSA (and thereby a PSA sheet (dirt-collecting member)).

In the art disclosed herein, for the acrylic block copolymer, solely one species or a combination of two or more species can be used. For instance, an acrylic block copolymer (H) that has a relatively high Mw and an acrylic block copolymer (L) that has a lower Mw than the acrylic block copolymer (H) can be used at a suitable weight ratio. By this, while curbing the increase in viscosity (melt viscosity) of the PSA, the organic dirt-collecting ability can be effectively increased. From the standpoint of obtaining greater effects of the combined use of the acrylic block copolymer (H) and acrylic block copolymer (L), they are preferable used so that the weight ratio (H/L) of acrylic block copolymer (H) to acrylic block copolymer (L) is in a range of 5/95 to 95/5 (preferably 10/90 to 90/10).

Each of the acrylic block copolymers used in such combination preferably has a Mw in a range of $3 \times 10^4$ to $30 \times 10^4$. For example, a preferable combination includes an acrylic block copolymer (H) having a Mw in a range of $5 \times 10^4$ to $20 \times 10^4$ (e.g. $7 \times 10^4$ to $20 \times 10^4$) and an acrylic block copolymer (L) having a Mw in a range of $3 \times 10^4$ to $8 \times 10^4$ and lower than the Mw of the acrylic block copolymer (H). A more preferable example of the combination includes an acrylic block copolymer (H) having a Mw in a range of $6 \times 10^4$ to $15 \times 10^4$ (e.g. $7 \times 10^4$ to $15 \times 10^4$) and an acrylic block copolymer (L) having a Mw in a range of $4 \times 10^4$ to $6 \times 10^4$ and lower than the Mw of the acrylic block copolymer (H). The weight ratio (H/L) of these acrylic block copolymers can be, for instance, 40/60 to 90/10. In a preferable embodiment, the weight ratio (H/L) can be 45/65 to 90/10, also 55/45 to 90/10, or even 65/35 to 85/15 (e.g. 75/25 to 85/15).

The art disclosed herein can be preferably implemented in an embodiment that uses, as the base polymer of the PSA, an acrylic block copolymer with Mw in a range of $5 \times 10^4$ to $20 \times 10^4$ (more preferably $6 \times 10^4$ to $15 \times 10^4$, e.g. $7 \times 10^4$ to $15 \times 10^4$). The PSA comprising such a base polymer can be favorably provided to the dirt-collecting member by, for instance, extrusion, injection molding, or coating upon dissolution in a suitable organic solvent as necessary.

The inclusion (presence) of two or more species of acrylic block copolymer with different Mw values, the Mw values of the respective copolymers and their weight ratio can be assessed, for instance, through the GPC measurement described earlier.

(Plasticizer)

The PSA in the art disclosed herein preferably comprises a plasticizer. The inclusion of plasticizer in the PSA increases the ease of release. It also lowers the melt viscosity of the PSA and thus the application is further facilitated. In yet another aspect, the inclusion of plasticizer also increases the organic dirt-collecting ability on the PSA surface. This can bring about, for instance, greater sebum dirt removability.

With the inclusion of plasticizer in the PSA, the organic dirt collected on the PSA surface can be absorbed into the PSA (e.g. PSA layer) and dispersed therein. Thus, even when the dirt-collecting ability is reduced by continuous use, the dirt-collecting ability may recover in relatively short time (e.g. several minutes or several hours) as a unique dirt-collecting ability recovery effect.

Figure 13:
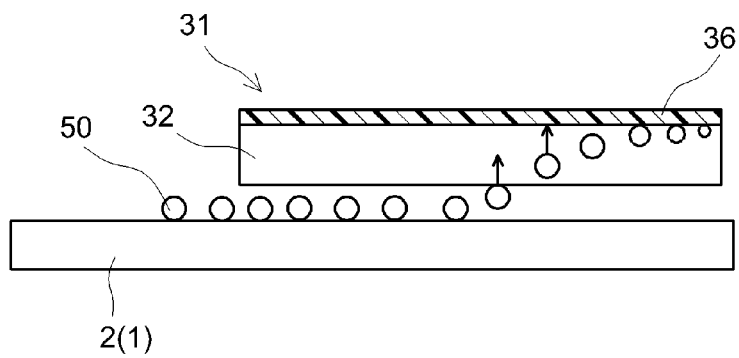
FIG. 13 schematically illustrates how the dirt-collecting ability recovers for the sticky cleaner according to an embodiment.

The dirt-collecting ability recovery effect is described with reference to FIG. 13. As schematically illustrated in FIG. 13, when the PSA layer 32 in dirt-collecting member (PSA sheet) 31 is allowed to make contact with a surface 2 of an article 1 such as a portable device, etc., the PSA layer 32 collects organic dirt 50 stuck on the surface 2. The PSA layer 32 has a property to not only collect organic dirt 50, but also causes it to migrate into the layer. Thus, the organic dirt 50 stuck on the surface of PSA layer 32 migrates with time into the PSA layer 32, leading to a lower presence of organic dirt 50 on the surface of PSA layer 32; and eventually, the surface of PSA layer 32 will be essentially free of the presence of organic dirt 50. In other words, the surface regains the same state as before the sticky cleaner is used. Accordingly, the term "recovery effect" refers to an effect such that when the PSA collects organic dirt and the dirt-collecting ability is temporarily reduced, the dirt-collecting ability recovers in a prescribed time period (e.g. several minutes, preferably several hours) and the PSA (e.g. PSA layer) regains the ability to collect dirt. It encompasses that the dirt-collecting ability requires short time for recovery.

Examples of plasticizer include phthalic acid esters such as dioctyl phthalate, diisononyl phthalate, diisodecyl phthalate, dibutyl phthalate, etc.; adipic acid esters such as dioctyl adipate, diisononyl adipate, etc.; trimellitic acid esters such as trioctyl trimellitate, etc.; sebacic acid esters; epoxidized vegetable oils such as epoxidized soybean oil and epoxidized flax seed oil; epoxidized fatty acid alkyl esters such as epoxidized fatty acid octyl esters; cyclic fatty acid esters such as sorbitan monolaurate, sorbitan monostearate, sorbitan monooleate, sorbitan trioleate and their ethylene oxide adducts as well as their derivatives; and the like. These can be used singly as one species or in a combination of two or more species. Preferable examples of plasticizer among them include adipic acid esters, epoxidized vegetable oils and epoxidized fatty acid alkyl esters. In particular, adipic acid esters are preferable.

Such a plasticizer may work, for instance in an acrylic PSA, at a high level in decreasing the adhesive strength of the PSA and in increasing the ability to collect organic dirt. These effects can be better produced with the inclusion of the plasticizer in an acrylic PSA whose base polymer is an acrylic block copolymer. It is particularly preferable that the plasticizer is included in an acrylic PSA that comprises, as the base polymer, an acrylic block copolymer that has as the soft segment (B) an Ac block comprising an alkyl acrylate with 6 or more (e.g. 6 to 12) carbon atoms in its alkyl group.

The amount of plasticizer added is not particularly limited. From the standpoint of providing easy-release properties, increasing the dirt-collecting ability, etc., the amount of plasticizer added to 100 parts by weight of the base polymer (e.g. an acrylic polymer) is, for instance, suitably 1 part by weight or greater. Its amount added is preferably 5 parts by weight or greater, more preferably 10 parts by weight or greater, or yet more preferably 15 parts by weight or greater. In a preferable embodiment, the plasticizer content can be 20 parts by weight or greater, also greater than 40 parts by weight, greater than 50 parts by weight, or even greater than 60 parts by weight. In an embodiment where the support member is placed on the backside of the PSA, when some of the plasticizer added to the PSA can be transferred to the support member, it is desirable to add the plasticizer in a slight excess to the PSA.

The plasticizer content in the PSA disclosed herein is preferably 150 parts by weight or less, more preferably 130 parts by weight or less, or yet more preferably 100 parts by weight or less, relative to 100 parts by weight of the base polymer. For instance, in a PSA that comprises as the base polymer an acrylic block copolymer that has as the soft segment (B) an Ac block comprising an alkyl acrylate having 6 or more (e.g. 6 to 12) carbon atoms in its alkyl group (e.g. an Ac block comprising the alkyl acrylate as the primary monomer), the amount of plasticizer added to 100 parts by weight of the base polymer can be 5 parts to 150 parts by weight (preferably 10 parts to 130 parts by weight, or more preferably 15 parts to 100 parts by weight). In a preferable embodiment, the amount of the plasticizer added to 100 parts by weight of the base polymer can also be 30 parts to 100 parts by weight, for instance, greater than 50 parts by weight up to 90 parts by weight. The plasticizer content can be preferably applied, for instance, in an embodiment where a PSA comprising an acrylic block copolymer as the base polymer is placed on a face of a support member comprising an acrylic resin as the primary component (a component accounting for 50% by weight or more).

<Tackifier>

The PSA in the art disclosed herein may include a tackifier as necessary. The addition of the tackifier may be beneficial in increasing the thermoplasticity (e.g. reducing the melt viscosity) of the PSA. As the tackifier, tackifier resins commonly known in the field of PSA (acrylic PSA) and the like can be used. Examples include a hydrocarbon-based tackifier resin, terpene-based tackifier resin, rosin-based tackifier resin, phenolic tackifier resin, epoxy-based tackifier resin, polyamide-based tackifier resin, elastomer-based tackifier resin and ketone-based tackifier resin. These can be used singly as one species or in a combination of two or more species.

Examples of the hydrocarbon-based tackifier resin include various hydrocarbon-based resins such as aliphatic hydrocarbon resins, aromatic hydrocarbon resins (xylene resins, etc.), alicyclic hydrocarbon resins, aliphatic-aromatic petroleum resins (styrene-olefin-based copolymers, etc.), aliphatic-alicyclic petroleum resins, hydrogenated hydrocarbon resins, coumarone-based resins, coumarone-indene-based resins, and the like. Examples of the terpene-based tackifier resin include terpene-based resins such as $\alpha$-pinene polymers, $\beta$-pinene polymers, etc.; modified terpene-based resins (e.g. terpenophenolic resins, styrene-modified terpene-based resins, hydrogenated terpene-based resins, hydrogenated terpenophenolic resins, etc.) obtained by subjecting these terpene-based resins to modification (phenol modification, aromatic modification, hydrogenation modification, etc.); and so on. Examples of the rosin-based tackifier resin include unmodified rosins (raw rosins) such as gum rosin, wood rosin, etc.; modified rosins (hydrogenated rosins, disproportioned rosins, polymerized rosins, other chemically modified rosins, etc.) obtained by subjecting these unmodified rosins to hydrogenation, disproportionation, polymerization, etc.; various other rosin derivatives; and so on. Examples of phenolic tackifier resins include resol-type and novolac-type alkylphenolic resins. Preferable tackifiers among these are terpene-based resins, modified terpene-based resins and alkylphenolic resins.

The softening point of the tackifier is not particularly limited. From the standpoint of reducing the melt viscosity, it is preferably 160° C. or lower, or more preferably 140° C. or lower. From the standpoint of avoiding an excessive increase in adhesive strength, it is preferably 60° C. or higher, or more preferably 80° C. or higher. The softening point of the tackifier is determined based on the softening point test method (ring and ball method) specified in JIS K 2207.

The amount of tackifier added is not particularly limited. From the standpoint of avoiding an excessive increase in adhesive strength, for instance, the amount of tackifier added can be, for instance, 50 parts by mass or less to 100 parts by mass of the base polymer (acrylic block copolymer), or it is usually suitably 40 parts by mass or less, or preferably 30 parts by mass or less. Alternatively, the PSA may be essentially free of such a tackifier. From the standpoint of obtaining greater effects of the tackifier (e.g. the effect to reduce the melt viscosity), the amount of tackifier added to 100 parts by mass of the base polymer is, for instance, suitably 1 part by mass or greater, preferably 5 parts by weight or greater, or more preferably 10 parts by weight or greater (e.g. 12 parts by weight or greater). The amount of tackifier added to 100 parts by weight of the base polymer can also be 15 parts by weight or greater.

<Other Components>

In addition to the base polymer, the PSA in the art disclosed herein may comprise, as necessary, another polymer or oligomer (or an optional polymer hereinafter) other than the base polymer, for instance, for purposes of adjusting the viscosity (e.g. reducing the melt viscosity) of the PSA, controlling the adhesive properties (e.g. reducing the adhesive strength) and so on. For instance, in a PSA comprising an acrylic block copolymer as the base polymer, an acrylic random copolymer having a Mw of about 500 to 10000 (typically about 800 to 5000) can be used as the optional polymer.

For instance, in a cleaner that comprises a dirt-collecting member having a synthetic resin support member on the backside of the PSA, some of the resin (polymer(s)) forming the support member may be added as the optional polymer to the PSA. This can increase the tightness of adhesion between the support member and the PSA especially in an embodiment where the PSA and the support member are placed next to each other. When a thermoplastic PSA and a support member made of thermoplastic synthetic resin are molded by co-extrusion into one body, some of the resin component(s) forming the synthetic resin can be added as the optional polymer of the PSA so that the melt viscosity of the PSA and the synthetic resin are close to each other. This is preferable from the standpoint of increasing the ease of molding.

In a preferable embodiment, the PSA may be essentially free of a polymer other than the base polymer. The polymer content excluding the base polymer can be less than 1 part by weight (typically 0 to 0.5 part by weight) to 100 parts by weight of the base polymer. On the other hand, in the embodiment using the optional polymer, the amount of the optional polymer added is not particularly limited. For instance, to 100 parts by weight of the base polymer, it can be 1 part by weight or greater, typically 3 parts by weight or greater, or preferably 5 parts by weight or greater. The amount of the optional polymer(s) added in the PSA is usually suitably 30 parts by weight or less to 100 parts by weight of the base polymer of the PSA, or it is preferably 20 parts by weight or less, or more preferably 15 parts by weight or less.

The PSA may be crosslinked as necessary. For instance, in a PSA whose base polymer is an acrylic random copolymer, the PSA is preferably crosslinked. For the crosslinking, a known crosslinking agent can be used. Preferable examples of the crosslinking agent include organic metal salts such as zinc stearate and barium stearate, epoxy-based crosslinking agents, and isocyanate-based crosslinking agents. Oxazoline-based crosslinking agents, aziridine-based crosslinking agents, metal chelate-based crosslinking agents, melamine-based crosslinking agents and the like can be used as well. For the crosslinking agent, solely one species or a combination of two or more species can be used. In particular, for the abilities to preferably undergo crosslinking with the carboxy group and to easily provide good workability (typically easy-release nature) and further for the excellent acid resistance, epoxy-based crosslinking agents and isocyanate-based crosslinking agents are preferable; it is particularly preferable to use an epoxy-based crosslinking agent and an isocyanate-based crosslinking agent together.

The amount of the crosslinking agent used is not particularly limited. From the standpoint of the easy-release nature, to 100 parts by weight of the base polymer (e.g. an acrylic polymer), it can be about 0.01 part to 10 parts by weight (e.g. 0.05 part to 5 parts by weight, typically 0.1 part to 5 parts by weight). When an epoxy-based crosslinking agent ($C_E$) and an isocyanate-based crosslinking agent ($C_I$) are used together, their weight ratio ($C_E/C_I$) is preferably 0.01 to 1 (e.g. 0.05 to 0.5, typically 0.1 to 0.4).

The PSA in the art disclosed herein can include, as necessary, various additives known in the PSA field as well. Examples of such additives include chain transfer agent, anti-aging agent, antioxidant, UV ray absorber, photostabilizer, antistatic agent, colorant (pigment, dye, etc.) and so on. The types and amounts of these non-essential additives can be the same as usual types and amounts in this type of PSA.

When the PSA is formed as PSA placed on a support member, the placement method is not particularly limited. For instance, it is preferable to apply a hot melt coating method where a PSA (thermoplastic PSA) heated into a molten state is directly applied to a support member by a heretofore known application means such as a roll coater, die coater, gravure coater, etc.; and the PSA is allowed to cool to near room temperature to form a PSA layer. In this case, the PSA is typically provided to the support member, as a PSA essentially free of an organic solvent (i.e. a solvent-free PSA). The PSA layer is typically formed (molded) in a continuous form, but is not limited to such a form. For instance, the PSA layer may be formed in a regular or random pattern of dots, stripes, etc.

Other examples of the method that can be preferably employed for placing the PSA on the support member include a method where the support member and the PSA are co-extruded into one body; a method where the PSA is placed on the outside of a pre-molded support member by extrusion or injection molding; and a method where the support member is joined to the PSA by press-fitting, insertion, clutching, etc.

The PSA can be crosslinked by a suitable means. Without applying a special crosslinking means, it can be used as a non-crosslinked PSA (i.e. a thermoplastic PSA). This is preferable from the standpoint of the convenience, etc.

Although no particular limitations are imposed, the PSA disclosed herein suitably has a melt viscosity at 180° C. of 200 Pa·s or lower, preferably 100 Pa·s or lower, or more preferably 50 Pa·s or lower (typically 20 Pa·s or lower, e.g. 10 Pa·s or lower). Such a PSA is suited for hot melt coating. The lower limit of the melt viscosity at 180° C. is not particularly limited. In view of the balance between the ease of application and adhesive properties, it is usually suitably 0.1 Pa·s or higher, preferably 1 Pa·s or higher, for instance, preferably 5 Pa·s or higher.

Herein, the melt viscosity can be measured by the following melt viscosity measurement method.

[Melt Viscosity Measurement Method]

Measurement device: programmable viscometer (DV-II+ Pro) available from Brookfield Engineering Measurement conditions: measurement temperature 180° C., speed of rotation 2.5 rpm, spindle SC4-27

Measurement procedure: 14 g of PSA is placed in a sample chamber and heated to melt at 180° C. The spindle is immersed in the molten PSA and rotated. A melt viscosity reading is taken at 30 minutes from the start of the rotation.

The PSA disclosed herein may be formed as a PSA layer upon application (typically at room temperature) as an aqueous PSA composition or as a solvent-based PSA composition to a support substrate followed by drying of the applied composition. For the solvent-based PSA composition, a general organic solvent can be used, such as ethyl acetate, toluene, hexane and ethanol. For the organic solvent, solely one species or a mixture of two or more species can be used. While no particular limitations are imposed, the PSA composition may comprise about 30% to 70% solid content (non-volatiles). Instead of direct application of the PSA composition to the support substrate, the PSA layer may be placed on the support substrate by applying the composition to a releasable surface (a release face), allowing it to dry to form a PSA layer on the release face, and adhering the PSA layer to a non-releasable face of the support substrate.

In a preferable embodiment of the cleaner disclosed herein, the cleaner comprises a PSA that exhibits a triolein absorption of 0.05 mg/mm$^3$ or greater in an area that comes in contact with a surface subject to cleaning. The triolein absorption is more preferably 0.08 mg/mm$^3$ or greater, or yet more preferably 0.10 mg/mm$^3$ or greater. The maximum triolein absorption is not particularly limited. For instance, it can be 0.50 mg/mm$^3$ or less.

Here, the triolein absorption refers to the triolein absorption at 15 days in triolein absorption measurement carried out by the method described later in the working examples. In the measurement, triolein is used as an analog of human sebum. A PSA with high triolein absorption tends to be able to absorb a large amount of organic dirt (e.g. human sebum) per volume. The sticky cleaner for organic dirt removal using such a PSA may be suited for downsizing or may have excellent performance retention against repeated use.

The type of PSA is not particularly limited as long as it satisfies the triolein absorption. For instance, it can be an acrylic PSA, a rubber-based PSA (e.g. a natural rubber-based PSA), a urethane-based PSA, etc. In particular, an acrylic PSA is preferable. For instance, an aforementioned acrylic PSA can be preferably used as the PSA that satisfies the triolein absorption. In the cleaner having the PSA that satisfies the triolein absorption, the hardness of the dirt-collecting member is not particularly limited. The cleaner disclosed herein can be preferably made in an embodiment where the triolein absorption is satisfied and the hardness is 90 or less.

<Support Member>

When the dirt-collecting member disclosed herein has a support member on the backside of the PSA, as the material forming the support member, various types of synthetic resin and rubber, and the like can be used. Foam bodies and non-foam bodies formed from these materials can be preferably used as the support member. Elastic or flexible materials can be preferably used. The use of such a support member facilitates fabrication of the dirt-collecting member with a hardness of 90 or less.

Examples of synthetic resin include acrylic resin, polyolefins (polyethylene, polypropylene, ethylene-propylene copolymers, etc.), polyester (polyethylene terephthalate, etc.), vinyl chloride resin, vinyl acetate resin, polyimide resin, polyamide resin, fluorocarbon resin, and thermoplastic elastomer (TPE) (e.g. an olefinic thermoplastic elastomer). As the acrylic resin, either one of the following can be used: a species synthesized using an acryloyl group-containing monomer in a large amount (typically, in an amount greater (by weight) than that of a methacryloyl group-containing monomer), and a species synthesized using a methacryloyl group-containing monomer in a large amount (typically, in an amount greater (by weight) than that of an acryloyl group-containing monomer). Here, the concept of acrylic resin may encompass a species generally called acrylic rubber. Examples of the rubber include natural rubber and butyl rubber. Examples of foam bodies include polyurethane foam, polyolefin foam (e.g. polyethylene foam) and polychloroprene rubber foam.

Other examples of the material that can be used to form the support member include paper, non-woven fabric, woven fabric, and metal. Examples of the paper include Japanese paper (washi), kraft paper, glassine paper, high-grade paper, synthetic paper, and top-coated paper. Examples of fabrics include a woven fabric and a non-woven fabric of a single species or of a blend of various fibrous substances. Examples of the fibrous substance include cotton, staple fiber, Manila hemp, pulp, rayon, acetate fiber, polyester fiber, polyvinyl alcohol fiber, and polyamide fiber, polyolefin fiber. Examples of the metal include aluminum and copper.

The support member can be a composite body of materials like these.

The support member may include, as necessary, various additives such as fillers (inorganic fillers, organic fillers, etc.), anti-aging agent, antioxidant, UV absorber, photostabilizer, antistatic agent, slip agent, plasticizer, and colorant (pigment, dye, etc.).

In a preferable embodiment of the cleaner disclosed herein, the dirt-collecting member (e.g. a PSA sheet) shows a triolein absorption (surface absorption) of 2 mg or greater per cm$^2$ area of the PSA in the area that comes in contact with a surface subject to cleaning. The surface absorption is preferably 5 mg or greater, more preferably 10 mg or greater, or yet more preferably 15 mg or greater (e.g. 20 mg or greater). The maximum surface absorption is not particularly limited. For instance, it can be 100 mg or less (typically 50 mg or less).

Here, the surface absorption refers to the triolein absorption at 4 days in surface absorption measurement carried out by the method described later in the working examples. In the measurement, triolein is used as an analog of human sebum. The dirt-collecting member with large surface absorption tends to show high removability of organic dirt (e.g. human sebum) per area. The sticky cleaner for organic dirt removal having such a dirt-collecting member may be suited for downsizing or may have excellent performance retention against repeated use.

The type of PSA is not particularly limited as long as it satisfies the surface absorption. For instance, it can be an acrylic PSA, a rubber-based PSA (e.g. a natural rubber-based PSA), a urethane-based PSA, etc. In particular, an acrylic PSA is preferable. An aforementioned acrylic PSA can be preferably used as the PSA that satisfies the surface absorption. In the cleaner having the PSA that satisfies the surface absorption, the hardness of the dirt-collecting member is not particularly limited. The cleaner disclosed herein can be preferably made in an embodiment having a dirt-collecting member that satisfies the surface absorption and has a hardness of 90 or less.

In the dirt-collecting member (e.g. a PSA sheet), the part that makes contact with the surface to be cleaned, e.g. PSA layer-side surface of the PSA sheet, may exhibit an adhesive strength of, for instance, 2 N/25 mm or less (typically 1 N/25 mm or less). The adhesive strength is preferably less than 1 N/25 mm. This means that the dirt-collecting member is easy-release. A cleaner having such an easy-release dirt-collecting member provides excellent dirt-removing workability since it requires little force to do the dirt-removing work on the surface. More specifically, the cleaner can be moved more smoothly on the surface (surface to be cleaned) of an article. For instance, it has advantages such that the cleaner can be easily separated from the surface after the dirt-removing operation. Even when the article surface (e.g. display of a tablet terminal) is covered with removable protection film (e.g. protection film made of a silicone-based or polyester-based synthetic resin, etc.), because of the easy-release nature, the protection film is less likely to peel off the article while cleaning the article surface covered with the protection film (i.e. the surface of the protection film). Thus, there is an advantage that the cleaning can be easily carried out while keeping the article surface covered with the protection film. In this case, the surface to be cleaned is the protection film surface and such a surface is included in the concept of the article surface referred to herein.

From the standpoint of the dirt-removing workability, the adhesive strength is, as described earlier, preferably less than 1 N/25 mm, more preferably 0.80 N/25 mm or less, or yet more preferably 0.60 N/25 mm or less. From the standpoint of the maneuverability in cleaning protective film surfaces, etc., the adhesive strength is suitably 0.50 N/25 mm or less, preferably 0.30 N/25 mm or less, or more preferably 0.20 N/25 mm or less. The adhesive strength can also be less than 0.10 N/25 mm.

From the standpoint of the dirt-collecting ability, the adhesive strength is usually suitably 0.001 N/25 mm or greater (typically 0.005 N/25 mm or greater), preferably 0.008 N/25 mm or greater, or more preferably 0.01 N/25 mm or greater. The adhesive strength can also be 0.03 N/25 mm or greater. The art disclosed herein can be preferably implemented, for instance, in an embodiment where the adhesive strength is 0.01 N/25 mm to 0.02 N/25 mm.

The adhesive strength can be adjusted, for instance, by the composition of the base polymer of the PSA, the presence of crosslinking in the PSA and the cross-link density if any, the use of plasticizer and its amount used if any, the pattern of the PSA layer formed, etc.

Herein, the adhesive strength refers to the 180° peel strength measured based on the following 180° peel test, using a stainless steel (SUS) plate as the adherend.

[180° Peel Test]

(1) As the test plate (adherend), a SUS304 steel plate polished with water-resistant sandpaper is used. The dimensions of the test plate is 2 mm or greater in thickness, about 50 mm in width and about 125 mm in length. The test plate is polished over its entire length evenly in the length direction with #360 water-resistant sandpaper.

(2) Before the adhesive strength measurement, the test plate polished with the water-resistant sandpaper is cleaned. In the cleaning procedure, the surface of the test plate is wiped with a wipe wet with reagent-grade toluene and further wiped vigorously with a dry wipe until the surface of the test plate dries out. Such cleaning procedure is repeated three times or more until the surface of the test plate is visually considered clean.

(3) The cleaned test plate (SUS plate) is left standing at a temperature of 23±2° C. and 50% relative humidity (RH) for five minutes or more and then used for the adhesive strength measurement.

(4) The dirt-collecting member (typically a PSA sheet) is cut into a rectangular sheet to obtain a test piece. The test piece is preferably about 100 mm to 300 mm long and about 15 mm to 30 mm wide. When the width is not 25 mm, the 180° peel strength (N/25 mm) is determined (converted) based on the ratio of actual width to 25 mm. The thickness of the test piece is not particularly limited.

(5) The resulting test piece is applied over its adhesive face (e.g. PSA layer-side surface) to the test plate (SUS plate) with a 2 kg roller moved back and forth once. When the test piece is adhesive over each face such as in a double-faced PSA sheet, it is preferable to apply about 25 μm thick polyethylene terephthalate (PET) film for backing to the surface opposite from the measured face.

(6) The resultant is stored in an environment at 23° C. and 50% RH for 30 minutes. Then, using a tensile tester, based on JIS Z 0237, in an environment at 23° C. and 50% RH, 180° peel strength to the SUS plate (to-SUS 180° peel strength) (N/25 mm) is measured at a peel angle of 180°, at a tensile speed of 1000 mm/min. The tensile tester is not particularly limited. A heretofore known tensile tester can be used. For instance, measurements can be made with trade name "TENSILON" available from Shimadzu Corporation.

While no particular limitations are imposed, when the dirt-collecting member is not in a sheet form, for instance, when it is formed columnar with the PSA on the outer circumference as in the sticky roll in the first embodiment described earlier, the dirt-collecting member can be configured so that the area that comes in contact with a surface subject to cleaning has a rolling adhesive strength of, for instance, 20 N/50 mm or less, or usually suitably 15 N/50 mm or less. From the standpoint of obtaining greater dirt-collecting workability, the rolling adhesive strength is preferably 10 N/50 mm or less, or more preferably 5 N/50 mm or less. The minimum rolling adhesive strength is not particularly limited. For instance, it can be 0.1 N/50 mm or greater. In a preferable embodiment, from the standpoint of obtaining adequate usability, the rolling adhesive strength can also be 1 N/50 mm or greater (e.g. 2 N/50 mm or greater).

Here, the rolling adhesive strength can be determined as follows: In particular, in an environment at 23° C. and 50% RH, a dirt-collecting member (a sticky roll) subject to measurement is placed on a glass plate and pressed with a load of 2 kg for three seconds to press-bond the PSA placed on the outer circumference of the dirt-collecting member onto the glass plate. Subsequently, with the dirt-collecting member axially supported with a suitable jig in a freely rotatable manner, one end of the jig is set in a chuck of a heretofore known tensile tester. In parallel with the surface of the glass plate, in a direction perpendicular to the axis of the dirt-collecting member, the dirt-collecting member is pulled at a rate of 1000 mm/min and the force required for rolling the dirt-collecting member during this is determined. Ten measurements (i.e. n=10) are taken and the measurement values are arithmetically averaged. As the glass plate used in the measurement, for instance, a commercial float glass plate can be used. The PSA sheet used in the measurement can be, for instance, about 50 mm long in the axial direction. When the axial length of the sticky roll is not 50 mm, it can be cut to a suitable length and subjected to measurement. Alternatively, the measurement value can be converted to the value per 50 mm of axial length.

The rolling adhesive strength can be adjusted, for instance, by the composition of the base polymer of the PSA, the presence of crosslinking in the PSA and the crosslinking density if any, the use of plasticizer and its amount used if any, the surface structure of the dirt-collecting member, etc.

EXAMPLES

Several working examples related to the present invention are described below although the present invention is not to be limited to these specific examples. In the following explanation, the terms "parts" and "%" are by weight unless specifically stated otherwise.

[Acrylic Polymer]

In the examples shown below, the following acrylic polymers A and B synthesized by a known living anionic polymerization method were used.

(Acrylic Polymer A)

As the acrylic polymer A, was used an acrylic block copolymer having a triblock structure of polyMAA block-poly2EHA/BA block-polyMMA block (or "MMA-2EHA/BA-MAA" hereinafter). The 2EHA to BA weight ratio (i.e. copolymerization ratio by weight) in the poly(2EHA/BA) block was 50/50. In the acrylic polymer A, the MMA/(2EHA+BA) weight ratio, that is a ratio of the combined weight of two polyMMA blocks to the weight of poly (2EHA/BA) block, was 18/82. The acrylic polymer A had a Mw of $10 \times 10^4$ and a Mn of $8.4 \times 10^4$ at a Mw/Mn of 1.21.

(Acrylic Polymer B)

As the acrylic polymer B, was used an acrylic block copolymer having a triblock structure of MMA-2EHA/BA-MMA. The 2EHA to BA weight ratio in the poly(2EHA/BA) block was 50/50. In the acrylic polymer A, the MMA/(2EHA+BA) weight ratio, that is a ratio of the combined weight of two polyMMA blocks to the weight of poly(2EHA/BA) block, was 19/81. The acrylic polymer B had a Mw of $5 \times 10^4$ and a Mn of $4.4 \times 10^4$ at a Mw/Mn of 1.13.

Experiment 1

Example 1

Were mixed 100 parts of acrylic polymer, 15 parts of tackifier and 50 parts of plasticizer in hot melt states to prepare a PSA composition. As the acrylic polymer, were used the acrylic polymers A and B at a weight ratio of 80/20. As the tackifier, was used trade name UH-115 (hydrogenated terpenophenolic resin) available from Yasuhara Chemical Co., Ltd. As the plasticizer, was used trade name MONO-CIZER W-242 (diisononyl adipate) available from DIC Corporation.

As a material for forming a support member, was obtained a soft acrylic resin (soft methacrylic resin under trade name PARAPET SA-CW001 available from Kuraray Co., Ltd.). The PSA composition and the soft acrylic resin were placed in an extruder and co-extruded (extruded in two layers) and the extrudate was cut to a length of about 50 mm. By this, was obtained a cylindrical sticky roll molded as one body with a cylindrical support member formed from the soft acrylic resin and a layer of PSA (acrylic PSAA) formed from the PSA composition to surround the outer circumference of the support member. The sticky roll was 9.6 mm in outer diameter and 5 mm in inner diameter. The PSA layer was 800 μm thick. The support member was 1.5 mm thick.

Using the sticky roll, was fabricated a cleaner 100 having a structure outlined in FIGS. 1 to 4. In particular, a stick-like holding member 120 was inserted and fastened in a center hole 135 of sticky roll 130 to fabricate a rolling member 110 having a columnar shape overall. Subsequently, the two ends of the holding member 120 were inserted in the through holes 168 eccentrically formed in protrusions 166 of lid 160 to attach the rolling member 110 to lid 160 in a freely rotatable manner. The protrusions 166 of lid 160 were inserted in the through holes 158 of main casing 150 to construct a sticky cleaner 100 according to this Example.

Example 2

Were hot-melt mixed 100 parts of an acrylic polymer, 70 parts of the same plasticizer as the one used in Example 1, and 10 parts of soft acrylic resin (soft methacrylic resin under trade name PARAPET SA-CW001 available from Kuraray Co. Ltd.) to prepare a PSA composition. As the acrylic polymer, was used the acrylic polymer A by itself. Using this PSA composition, but otherwise in the same manner as Example 1, was obtained a cylindrical sticky roll having a layer of PSA (acrylic PSA B) formed from the PSA composition on the outer circumference of a cylindrical support member formed from the soft acrylic resin. Using this sticky roll, was constructed a sticky cleaner.

Examples 3 and 4

For comparison with the sticky cleaners according to Examples 1 and 2, were obtained two different sticky cleaners commercially available for cleaning displays of smartphones and tablet-type information terminals. Hereinafter, these are referred to as commercial products X1 and X2. Both the commercial products X1 and X2 have columnar rolling members. In the commercial product X1 (Example 3), the outer circumference of the sticky roll forming the rolling member is formed with a thermoplastic elastomer (TPR)-based PSA of 1.2 mm thickness. In the commercial product X2 (Example 4), the outer circumference of the sticky roll forming the rolling member is formed with a silicone elastomer-based PSA of 3.6 mm thickness.

The sticky cleaners according to Examples 1 to 4 were subjected to the following measurements and evaluations.

(Measurement of Hardness)

Based on JIS K 7312, using an Asker rubber durometer (type C), hardness was determined with respect to the outer circumferential face (the surface of the PSA layer) of the sticky roll according to each Example. As the measurement value, the value immediately after the measurement was taken.

(Measurement of Triolein Absorption)

A glass container was shallowly filled with triolein. The sticky cleaner according to each Example was rolled over to deposit a sufficient amount of triolein on the entire outer circumferential face of the sticky roll. Deposition of triolein was avoided as much as possible for other areas besides the outer circumferential face of the sticky roll. At 3 days, 4 days, 9 days, 15 days and 16 days after triolein was deposited on the outer circumferential face of the sticky roll, the sticky roll was weighed. The differences in weight of the sticky cleaner between the resulting weights and the initial weight were divided by the volume of the PSA to determine triolein absorption per volume of the PSA. The sticky cleaner was weighed after the surface of the sticky roll was gently wiped to remove any triolein that had not been absorbed into the PSA. After the weight was determined, triolein was deposited once again on the entire outer circumferential face of the sticky roll to continue the experiment. The experiment was carried out using three samples (i.e. n=3) for each Example and the measurement values were arithmetically averaged to determine the triolein absorption. The results are shown in Table 1 and FIG. 14. The triolein absorption shown in Table 1 is the value at 15 days from the start of the experiment.

(Fingerprint Removability Test)

A smartphone (docomo NEXT series XPERIA® Z SO-02E available from Sony Mobile Communications AB) was obtained, with protection film applied to its display (a smooth surface made of aluminosilicate glass). As the protection film, protection film included with a jacket (a hard coating, gradation, shell jacket available from Ray-Out Co., Ltd.) for the smartphone was used. The protection film surface was thoroughly wiped with a non-woven fabric wipe (waste cloth) to remove any dirt.

Subsequently, sebum components on the tester's face (cheeks) were rubbed onto a finger (index finger) and the finger was firmly pressed on the protection film surface for two seconds to transfer the organic dirt (fingerprint) formed of sebum components on the finger to the protection film.

The protection film surface with the fingerprint was then cleaned with the cleaner according to each example. In particular, the PSA sheet roll of the cleaner according to each example was allowed to rotate five continuous times in one direction over the protection film surface. The rotational speed was about 0.5 m/sec and the pressure applied by the operator for the rotation was about 700 g. Subsequently, the fingerprint removability was graded according to the following five levels.

5 points: The fingerprint completely disappeared.
4 points: The fingerprint mark mostly disappeared.
3 points: The fingerprint mark partially disappeared.
2 points: The fingerprint mark faded, but did not disappear.
1 point: No changes were observed in the fingerprint intensity.

The test was conducted with sebum of three testers A (female, 24 years old), B (male, 26 years old) and C (male, 24 years old). The results are shown in Table 1 as the total scores of fingerprint removability for the three testers.

TABLE 1

| | PSA | | Hardness | | Triolein |
|---|---|---|---|---|---|
| | Type | Thickness (mm) | of sticky roll | Fingerprint removability | absorption (mg/mm$^3$) |
| Ex. 1 | Acrylic A | 0.8 | 48 | 11 | 0.14 |
| Ex. 2 | Acrylic B | 0.8 | 48 | 12 | 0.20 |
| Ex. 3 | TPR-based | 1.2 | 57 | 7 | 0.03 |
| Ex. 4 | Silicone-based | 3.6 | 28 | 3 | 0.02 |

Figure 14:
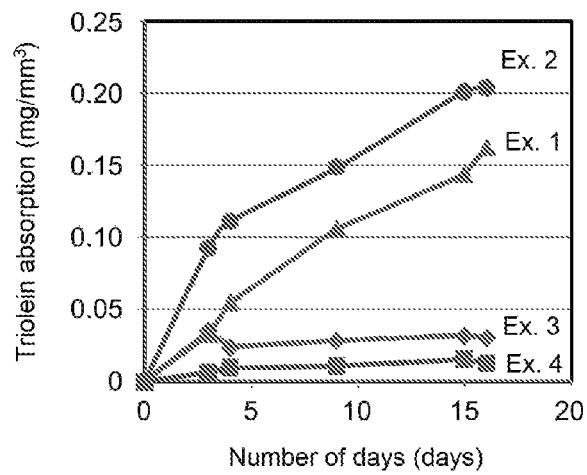
FIG. 14 shows a chart of absorption of triolein per volume of PSA.

As shown in Table 1 and FIG. 14, as compared to the TPR-based PSA and silicone-based PSA used in the commercial sticky cleaners for smartphones, the acrylic PSAs A and B used in Examples 1 and 2 showed clearly high triolein absorption per volume, exhibiting excellent sebum absorbability. It is presumed that these differences in triolein absorption affected the differences in fingerprint removability.

The acrylic PSA A alone and the acrylic PSA B alone were individually extruded to prepare sticky rolls having the same outer shapes as Examples 1 and 2. The hardness of the outer circumferential faces of these sticky rolls was determined. The acrylic PSAs A and B both had a hardness of 7.

The rolling adhesive strength was determined for the cleaners according to Examples 1 and 2. It was 7.8 N/50 mm for Example 1 and 3.9 N/50 mm for Example 2. Both cleaners exhibited good dirt removal workability. The cleaner according to Example 2 showed superior dirt removal workability.

Experiment 2

Example 5

To the surface of a 38 μm thick polyethylene terephthalate (PET) sheet as a support substrate (about 8 cm wide), was applied the acrylic PSA A to prepare a single-faced PSA sheet having a PSA layer of 50 μm thickness (PSA thickness) formed on one face of the support substrate. The resulting single-faced PSA sheet was wound around the surface of a cylindrical holding member (20 mm diameter) made of hard resin to form a sticky roll. The holding member was attached to a tip of a grip member in a freely rotatable manner to construct a sticky cleaner as schematically illustrated in FIGS. 10 and 11.

Example 6

In place of the acrylic PSA A, was used the acrylic PSA B. Otherwise in the same manner as Example 5, was constructed a sticky cleaner according to this Example.

(Measurement of Hardness)

The hardness was determined for the single-faced PSA sheets according to Examples 5 and 6 in the same manner as in Experiment 1. The results are shown in Table 2. Table 2 shows the hardness of Examples 1 and 2 determined in Experiment 1 as well.

(Fingerprint Removability Test)

The sticky cleaner according to Example 5 was tested for fingerprint removability in the same manner as in Experiment 1. The result is shown in Table 2. Table 2 shows the fingerprint removability test results of Examples 1 and 2 determined in Experiment 1 as well. Example 6 was not tested for fingerprint removability.

(Measurement of Surface Absorption)

Figure 15:
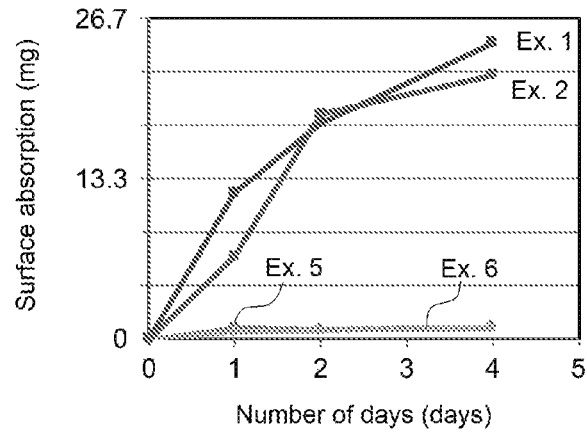
FIG. 15 shows a chart of absorption (surface absorption) of triolein per area of PSA

A glass container was shallowly filled with triolein. The sticky cleaner according to each Example was rolled over to deposit a sufficient amount of triolein on the entire outer circumferential face of the sticky roll. Deposition of triolein was avoided as much as possible for other areas besides the outer circumferential face of the sticky roll. At 1 day, 2 days and 4 days after triolein was deposited on the outer circumferential face of the sticky roll, the sticky roll was weighed. The differences in weight of the sticky cleaner between the resulting weights and the initial weight were divided by the surface area of the PSA (the surface area of the outer circumferential face of the sticky cleaner) to determine triolein absorption per cm$^2$ area of the PSA (surface absorption). The sticky cleaner was weighed after the surface of the sticky roll was gently wiped to remove any triolein that had not been absorbed into the PSA. After the weight was determined, triolein was deposited once again on the entire outer circumferential face of the sticky roll to continue the experiment. The experiment was carried out using three samples (i.e. n=3) for each Example and the measurement values were arithmetically averaged to determine the surface absorption. The results are shown in Table 2 and FIG. 15. The triolein absorption shown in Table 2 is the value at 4 days from the start of the experiment.

TABLE 2

| | Support member type | PSA | | | Surface absorption (mg) |
|---|---|---|---|---|---|
| | | Type | Thickness (μm) | Hardness of sticky roll | Fingerprint removability |
| Ex. 1 | Soft acrylic | Acrylic A | 800 | 48 | 11 | 24.8 |
| Ex. 2 | Soft acrylic | Acrylic B | 800 | 48 | 12 | 21.9 |
| Ex. 3 | PET | Acrylic A | 50 | 93 | 8 | 1.02 |
| Ex. 4 | PET | Acrylic B | 50 | 93 | — | 0.88 |

As shown in Table 2, as compared to Example 5 with the sticky roll having a hardness greater than 90, Examples 1 and 2 with the sticky rolls having a hardness of 48 exhibited greater fingerprint removability. This difference may be attributed to an increase in contact area (increased contact time) on the surface being cleaned due to the cushioning properties provided to the sticky rolls. As compared to Examples 5 and 6 with 50 μm thick PSA layers, in Examples 1 and 2 with 16 times thicker (800 μm) PSA layers, the triolein absorption per area of PSA increased by a factor of at least 20. These results indicate that by increasing the thickness of the PSA, the performance retention against repeated use can be effectively enhanced.

Although specific embodiments of the present invention have been described in detail above, these are merely for illustrations and do not limit the scope of patent claims. The art according to the patent claims includes various modifications and changes made to the specific embodiments illustrated above.

REFERENCE SIGNS LIST 1 portable device (article)
2 surface (display)
10, 100, 200 sticky cleaners
20, 120 holding member
30 PSA sheet roll (dirt-collecting member)
31 PSA sheet
32, 132, 232 PSA layers (PSA)
36 support substrate (support member)
50 organic dirt
110 rolling member
130 sticky roll (dirt-collecting member)
134 support member
135 center hole
140 casing
150 main casing body (grip member)
158 through hole
160 lid
168 through hole
231 PSA sheet (dirt-collecting member)
232A adhesive face
236 support substrate (support member)

The invention claimed is:

1. A sticky cleaner used for removing organic dirt deposited on an article surface,
the sticky cleaner comprising a dirt-collecting member that collects the organic dirt upon contact with the article surface, wherein
the dirt-collecting member has a pressure-sensitive adhesive in an area that comes in contact with the article surface, and
the pressure-sensitive adhesive has a triolein absorption of 0.05 mg/mm$^3$ or greater.

2. The sticky cleaner according to claim 1, wherein the area that comes in contact with the article surface in the dirt-collecting member has a hardness of 90 or less.

3. The sticky cleaner according to claim 1, wherein the pressure-sensitive adhesive has a thickness of 200 μm or greater.

4. The sticky cleaner according to claim 1, wherein the dirt-collecting member comprises a support member on the backside of the pressure-sensitive adhesive.

5. The sticky cleaner according to claim 4, wherein an acrylic resin is used as a material forming the support member.

6. The sticky cleaner according to claim 1, wherein the dirt-collecting member constitutes a columnar rolling member and the pressure-sensitive adhesive forms the outer circumferential face of the rolling member.

7. The sticky cleaner according to claim 1, wherein the pressure-sensitive adhesive comprises an acrylic block copolymer.

8. The sticky cleaner according to claim 1, wherein the pressure-sensitive adhesive comprises a plasticizer.

9. A sticky cleaner used for removing organic dirt deposited on an article surface,
the sticky cleaner comprising a dirt-collecting member that collects the organic dirt upon contact with the article surface, wherein
the dirt-collecting member has a pressure-sensitive adhesive in an area that comes in contact with the article surface, and
in the area, the dirt-collecting member exhibits a triolein absorption of 2 mg or greater per cm$^2$ area of the pressure-sensitive adhesive.

10. The sticky cleaner according to claim 9, wherein the dirt-collecting member has a hardness of 90 or less in the area that comes in contact with the article surface.

11. The sticky cleaner according to claim 9, wherein the pressure-sensitive adhesive has a thickness of 200 μm or greater.

12. The sticky cleaner according to claim 11, wherein the pressure-sensitive adhesive comprises a plasticizer.

13. The sticky cleaner according to claim 9, wherein the dirt-collecting member comprises a support member on the backside of the pressure-sensitive adhesive.

14. The sticky cleaner according to claim 13, wherein an acrylic resin is used as a material forming the support member.

15. The sticky cleaner according to claim 9, wherein the dirt-collecting member constitutes a columnar rolling member and the pressure-sensitive adhesive forms the outer circumferential face of the rolling member.

16. The sticky cleaner according to claim 9, wherein the pressure-sensitive adhesive comprises an acrylic block copolymer.

17. The sticky cleaner according to claim 9, wherein the pressure-sensitive adhesive comprises a plasticizer.

* * * * *